(12) United States Patent
Endo et al.

(10) Patent No.: US 7,304,805 B2
(45) Date of Patent: Dec. 4, 2007

(54) ZOOM LENS SYSTEM AND IMAGE PICKUP APPARATUS INCLUDING THE SAME

(75) Inventors: Hiroshi Endo, Utsunomiya (JP); Kenji Obu, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/453,192

(22) Filed: Jun. 13, 2006

(65) Prior Publication Data
US 2006/0285224 A1  Dec. 21, 2006

(30) Foreign Application Priority Data
Jun. 15, 2005  (JP) .............................. 2005-175494

(51) Int. Cl.
*G02B 15/14* (2006.01)
(52) U.S. Cl. ...................... 359/690; 359/676
(58) Field of Classification Search ............... 359/676, 359/686, 687, 689, 690
See application file for complete search history.

(56) References Cited

U.S. PATENT DOCUMENTS

| | | | |
|---|---|---|---|
| 4,241,983 A | 12/1980 | Kitagishi | |
| 4,348,084 A | 9/1982 | Kitagishi et al. | |
| 4,913,535 A | 4/1990 | Robb | |
| 5,629,799 A | 5/1997 | Maruyama et al. | |
| 5,790,321 A | 8/1998 | Goto | |
| 5,872,658 A | 2/1999 | Ori | |
| 6,025,962 A | 2/2000 | Suzuki | |
| 6,115,188 A | 9/2000 | Nishio et al. | |
| 6,404,561 B1 | 6/2002 | Isono et al. | |
| 6,496,310 B2 | 12/2002 | Fujimoto | |
| 6,594,087 B2 | 7/2003 | Uzawa et al. | |
| 7,139,131 B2* | 11/2006 | Nanba et al. | ............... 359/687 |
| 2007/0014025 A1* | 1/2007 | Yokoyama | ............... 359/642 |

FOREIGN PATENT DOCUMENTS

| | | |
|---|---|---|
| JP | 55-36886 A | 3/1980 |
| JP | 55-147606 A | 11/1980 |
| JP | 6-324262 A | 11/1994 |
| JP | 6-331887 A | 12/1994 |
| JP | 9-211329 A | 8/1997 |
| JP | 10-90601 A | 4/1998 |
| JP | 11-119092 A | 4/1999 |
| JP | 2001-194590 A | 7/2001 |
| JP | 2002-62478 A | 2/2002 |
| JP | 2002-156582 A | 5/2002 |

* cited by examiner

*Primary Examiner*—Scott J. Sugarman
*Assistant Examiner*—Darryl J. Collins

(57) ABSTRACT

At least one exemplary embodiment is directed to a zoom lens system having a telephoto-type configuration at the telephoto end. When assuming that an Abbe number is vd, and a partial dispersion ratio is θgF, this zoom lens system includes a refractive optical element having positive refracting power made up of a solid material that can satisfy the following conditions:

$-2.100 \times 10^{-3} \cdot vd + 0.693 < \theta gF$ $0.555 < \theta gF < 0.9$

Thus, facilitating the configuration of a zoom lens system capable of appropriately correcting and/or reducing various aberrations, including a chromatic aberration straddling the entire zoom area.

23 Claims, 18 Drawing Sheets

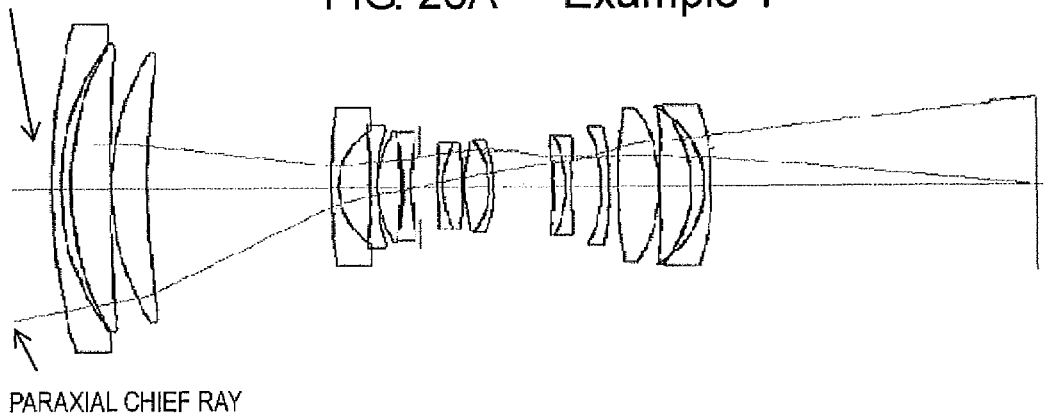
FIG. 26A    Example 1
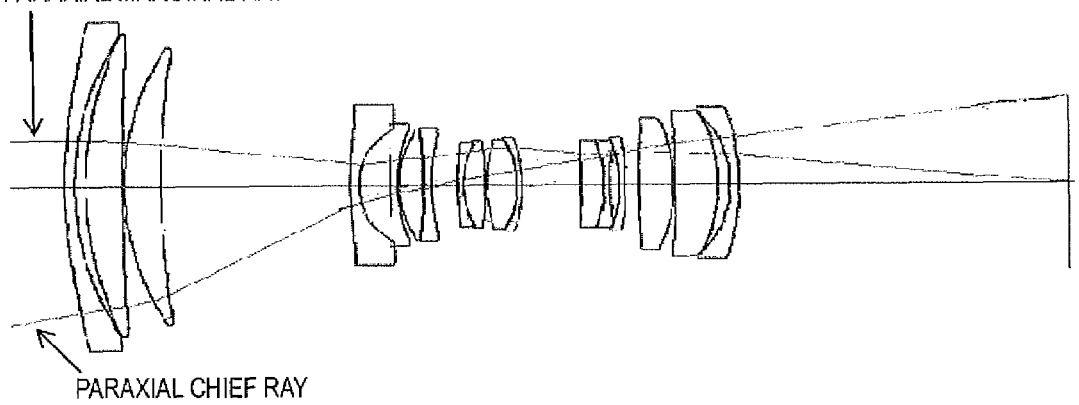
FIG. 26B    Example 2
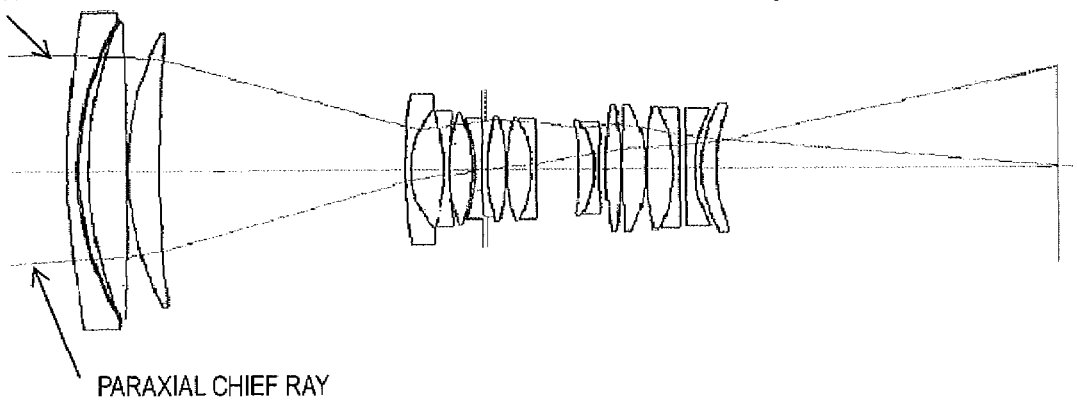
FIG. 26C    Example 3

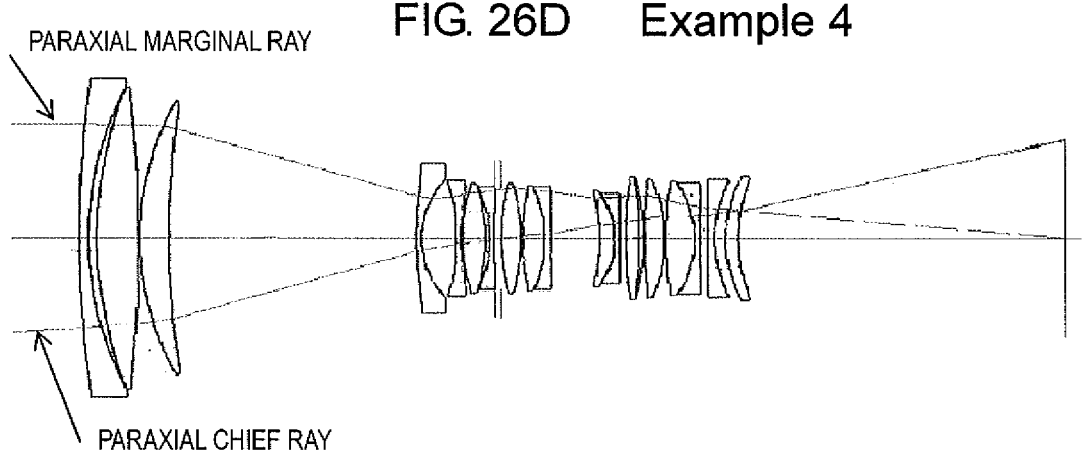
FIG. 26D  Example 4
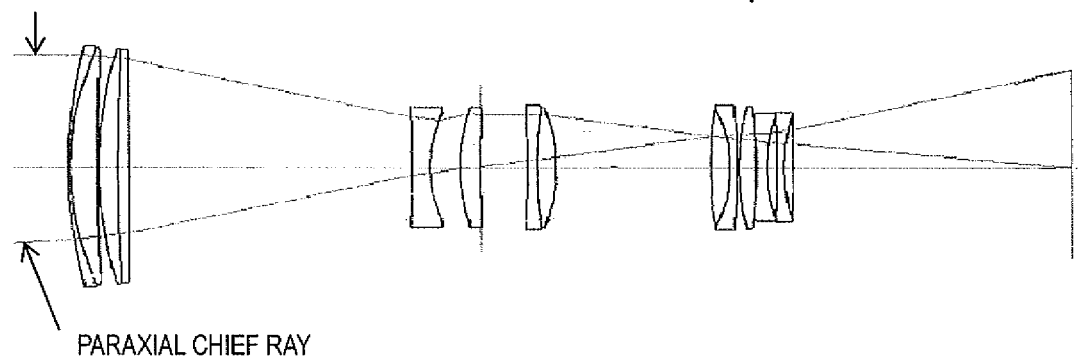
FIG. 26E  Example 5
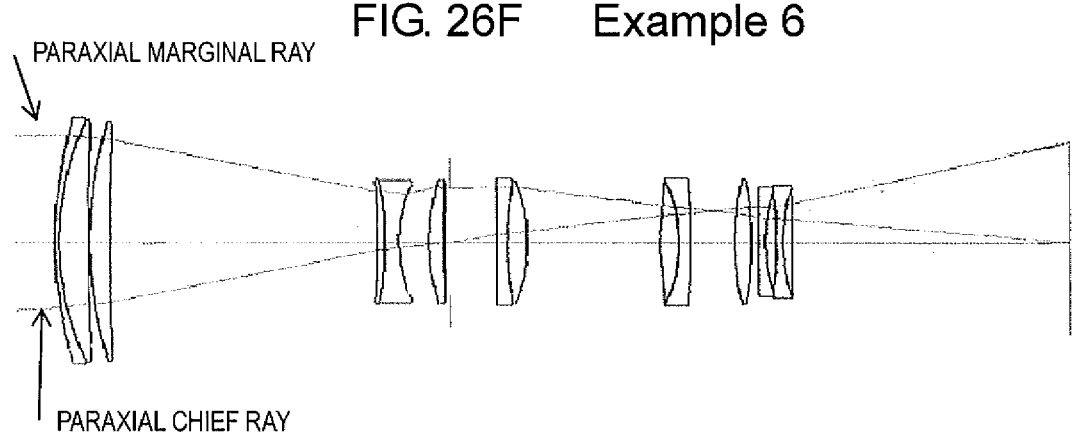
FIG. 26F  Example 6

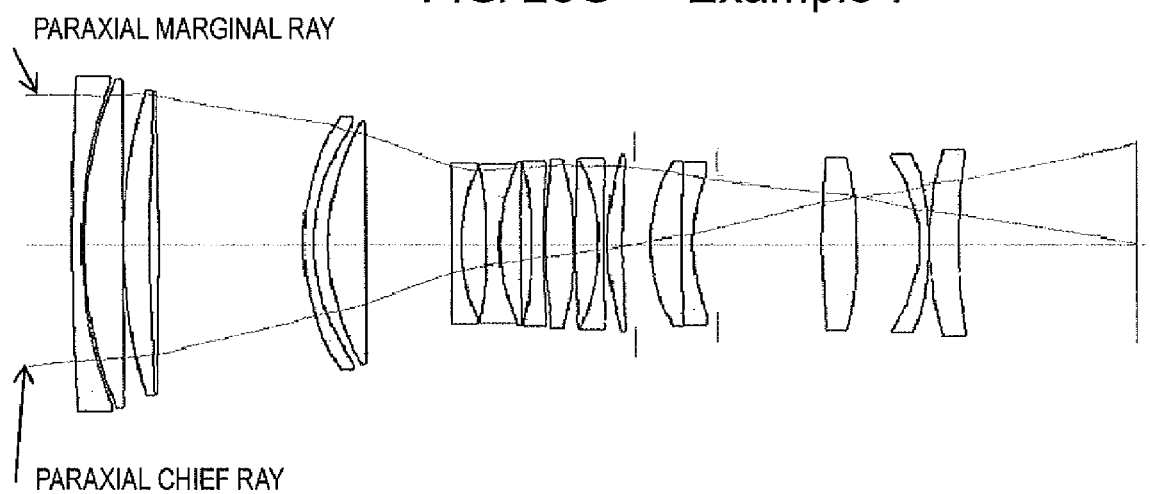
FIG. 26G    Example 7
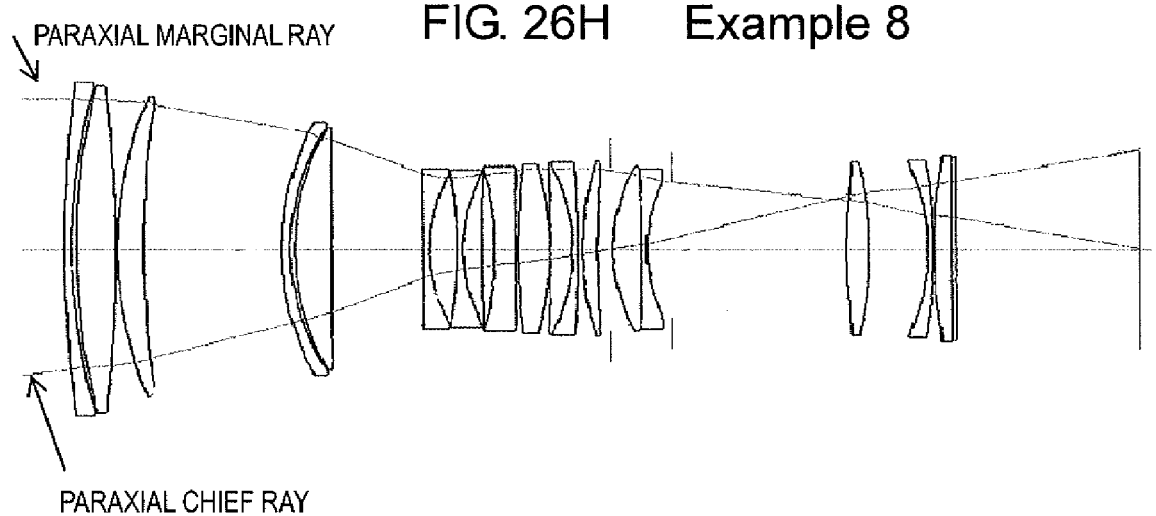
FIG. 26H    Example 8

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus having this system.

2. Description of the Related Art

In recent years, with image pickup elements (photoelectric transfer devices) employed for an image pickup apparatus such as a digital camera, high pixilation has advanced. In response to this, high resolution has been demanded for camera lenses (imaging optical systems) employed for an image pickup apparatus which can have a high pixel image pickup element. In order to realize a high resolution camera lens, it is useful for various aberrations relating to image capabilities at a single color (single wavelength) such as a spherical aberration, and a coma aberration to be reduced well, and in addition to this, it is useful for an image obtained when employing white illumination light to have a well-corrected chromatic aberration so as not to exhibit chromatic bleeding.

On the other hand, in order to enlarge a photographing area, there is demand for camera lenses to serve as a zoom lens which can have a high zoom ratio. Generally, further lengthening of the focal length at a zoom position at the telephoto end to obtain a high zoom ratio causes an increase in the chromatic aberration of magnification (lateral chromatic aberration) to occur at a zoom position on the wide-angle side, and also causes an increase in the chromatic aberration of magnification and axial chromatic aberration (longitudinal chromatic aberration) to occur at a zoom position on the telephoto side. Accordingly, in order to obtain imaging capabilities of high image quality, it has been important to appropriately perform not only primary spectrum correction but also secondary spectrum correction for chromatic aberration. Note that herein when referring to corrections or correcting an aberration, a reduction of the aberration or a correction of the aberration is intended.

In addition to this, recently, there is strong demand for reduction in size of the entire camera lens, due to the reduction in size of image pickup apparatuses.

Generally, with a photographic optical system, the more the entire lens length (distance from the first surface to the image surface, also referred to as "entire optical length") is reduced, the more chromatic aberrations such as axial chromatic aberration and chromatic aberration of magnification occur, and also optical capabilities deteriorate. In particular, with a telephoto-type optical system, the longer the focal length is, the more chromatic aberration expands, and also the more chromatic aberration due to reduction of the entire lens length increases.

As for a method for reducing such occurrences of chromatic aberrations, an achromatic method using an extraordinary partial dispersion material, or an achromatic method using a diffraction grating have been widely known.

With a telephoto-type optical system, a positive lens made up of a low dispersion material having extraordinary partial dispersion such as fluorite, and a negative lens made up of a high dispersion material are commonly employed for reducing chromatic aberrations as a forward lens unit in which the positions where a paraxial marginal ray and a paraxial chief ray pass through are relatively high as to the optical axis. Various types of such a telephoto-type optical system have been discussed (see Japanese Patent Publication No. 1985-49883 (corresponding to U.S. Pat. No. 4,241,983), Japanese Patent Publication No. 1985-55805 (corresponding to U.S. Pat. No. 4,348,084), and Japanese Patent Laid-Open No. 1999-119092 (corresponding to U.S. Pat. No. 6,115,188)).

Note that a paraxial marginal ray is a paraxial ray incident in parallel with the optical axis of an optical system with the height from the optical axis as 1 when normalizing the focal length of the entire optical system to 1. Also, a paraxial chief ray is a paraxial ray passing through the intersection between the incident pupil and optical axis of an optical system, of rays incident by −45 degrees as to the optical axis when normalizing the focal length of the entire optical system to 1. With the incident angle of the optical system, the clockwise rotation measured from the optical axis is assumed to be positive, and the counterclockwise rotation is assumed to be negative. Note that an object is assumed to be present on the left side of the optical system, and the ray incident to the optical system from the object side is assumed to proceed from the left to the right.

Also, a telephoto-type optical system has been known where a diffractive optical element is employed for correcting a chromatic aberration without employing an extraordinary partial dispersion material (see Japanese Patent Laid-Open No. 1994-324262 (corresponding to U.S. Pat. No. 5,790,321), Japanese Patent Laid-Open No. 1994-331887 (corresponding to U.S. Pat. No. 5,629,799), Japanese Patent Laid-Open No. 1997-211329 (corresponding to U.S. Pat. No. 5,872,658)).

Japanese Patent Laid-Open No. 1994-324262 (corresponding to U.S. Pat. No. 5,790,321) and Japanese Patent Laid-Open No. 1994-331887 (corresponding to U.S. Pat. No. 5,629,799) have discussed a telephoto-type optical system having an F number of F 2.8 or so of which a chromatic aberration is corrected relatively appropriately by combining a diffraction-type optical element and a refractive-type optical element.

In addition to these, as for a material, which can have a correction function of a chromatic aberration related to a diffractive optical element, a liquid material exhibiting properties of equivalently high dispersion and also equivalently extraordinary partial dispersion has been known, and an achromatic optical system employing this material has been known (see U.S. Pat. No. 4,913,535 and Japanese Patent Laid-Open No. 2002-156582 (corresponding to U.S. Pat. No. 6,496,310)).

Note that as for a telephoto-type zoom lens, a zoom lens, which can have a 4-unit configuration made up of lens units of positive, negative, positive, and positive refracting power in order from the object side to the image side in which a chromatic aberration is corrected with glass having extraordinary dispersion properties, has been known (see Japanese Patent Laid-Open No. 2001-194590 (corresponding to U.S. Pat. No. 6,404,561) and Japanese Patent Laid-Open No. 2002-62478 (corresponding to U.S. Pat. No. 6,594,087)).

Also, a zoom lens made up of lens units of positive, negative, positive, negative, and positive refracting power in order from the object side to the image side has been known (see Japanese Patent Laid-Open No. 1998-90601 (corresponding to U.S. Pat. No. 6,025,962)).

Glass having great extraordinary dispersion properties such as fluorite or Product Name S-FPL51 manufactured by Ohara Inc. is low in a material refractive index. Accordingly, it is useful for performing the desired secondary spectrum correction to equivalently enlarge the curvature of a lens surface to enforce the refracting power of the lens.

Consequently, a lens made up of such a material has a tendency of enlarging the lens thickness thereof. Also, with an optical system for aiming at suitable chromatic correction effects as apochromat, in order to realize the desired chromatic correction effects, it can be necessary in some circumstances to increase the number of lenses and cemented lens surfaces, and consequently, the entire optical length has been apt to increase to secure the lens thickness.

With the telephoto-type optical systems employing fluorite or other related or equivalent materials as known by one of ordinary skill in the relevant art discussed in Japanese Patent Publication No. 1985-49883 (corresponding to U.S. Pat. No. 4,241,983), Japanese Patent Publication No. 1985-55805 (corresponding to U.S. Pat. No. 4,348,084), and Japanese Patent Laid-Open No. 1999-119092 (corresponding to U.S. Pat. No. 6,115,188), a chromatic aberration is correctable in the case of the entire optical length being set relatively long. However, it can be difficult to correct occurrence of a chromatic aberration accompanied with reduction of the entire optical length. This is because this technique simply reduces chromatic aberrations generated by the forward lens unit itself using low dispersion and extraordinary partial dispersion included in the material such as fluorite. In order to correct chromatic aberrations increased along with reduction of the entire optical length, for example, with an optical system employing low-dispersion glass, which can have a great Abbe number such as fluorite, the chromatic aberration thereof is not changed unless the refracting power of the lens surface is greatly changed. This makes it difficult to satisfy correction of a chromatic aberration and correction of various aberrations such as a spherical aberration, coma aberration, and astigmatism, contemporaneously.

On the other hand, diffractive optical elements have a sufficient correction function of a chromatic aberration. However, the diffraction light of unnecessary diffraction order other than the diffraction light of design diffraction order actually employed becomes a colored flare light, which deteriorates image formation capabilities.

Also, the achromatic optical system employing a liquid material exhibiting relatively extraordinary partial dispersion properties has no function for agglutinating an optical lens, and also needs to have a configuration for sealing. Also, this system also has a problem where properties such as a refractive index and dispersion properties change along with change in temperature, and accordingly, we can say that environmental capabilities are far from being sufficiently satisfied.

SUMMARY OF THE INVENTION

At least one exemplary embodiment is directed to a zoom lens system which can be used in many different image pickup apparatus, for example digital cameras, video camcorders, silver-salt photograph cameras, and other image pickup apparatus as known by one of ordinary skill in the relevant arts.

At least one exemplary embodiment is directed to a zoom lens system having high optical capabilities in which various aberrations including a chromatic aberration can be corrected straddling on the entire zoom area, and an image pickup apparatus including this system.

According to at least one exemplary embodiment, a zoom lens system which can have a telephoto-type configuration at the telephoto end, and includes a refractive optical element having positive refracting power made up of a solid material which can satisfy the following conditions $-2.100 \times 10^{-3} \cdot vd + 0.693 < \theta gF$ $0.555 < \theta gF < 0.9$, where $vd$ is an Abbe number, and $\theta gF$ is a partial dispersion ratio.

According to at least one exemplary embodiment, an zoom lens system can include a zoom lens made up of a first lens unit having positive optical power, a second lens unit having negative optical power, and a rear lens component having positive optical power as a whole including an aperture stop in order from the object side to the image side, and the interval between the first lens unit and the second lens unit, and the interval between the second lens unit and the rear lens component are changed during zooming, where when assuming that at least one of the first lens unit and the lens unit having positive refracting power positioned closer to the image side than the aperture stop within the rear lens component includes a refractive optical element having positive refracting power made up of a solid material which can satisfy the following conditions $-2.100 \times 10^{-3} \cdot vd + 0.693 < \theta gF$ $0.555 < \theta gF < 0.9$, where $vd$ is an Abbe number, and $\theta gF$ is a partial dispersion ratio.

Here, the term "telephoto-type" is equivalent to:

an optical system in which the maximum value of the height, from the optical axis, of a paraxial marginal ray passing through the lens surface further forward than an intersection P between the optical axis and a paraxial chief ray is greater than the maximum value of the height, from the optical axis, of the paraxial marginal ray passing through more the lens surface backward from the intersection P; and an optical system of which the entire optical length is shorter than the focal length.

Further features of the present invention will become apparent from the following description of exemplary embodiments with reference to the attached drawings.

BRIEF DESCRIPTION OF THE DRAWINGS

FIGS. 26A-H illustrate example cross-sectional views of the lenses at a telephoto end of each embodiment respectively (referred to as Examples 1 through 8 in the specification), which includes a paraxial marginal ray and paraxial chief ray for each embodiment.

DESCRIPTION OF THE EMBODIMENTS

Figure 1:
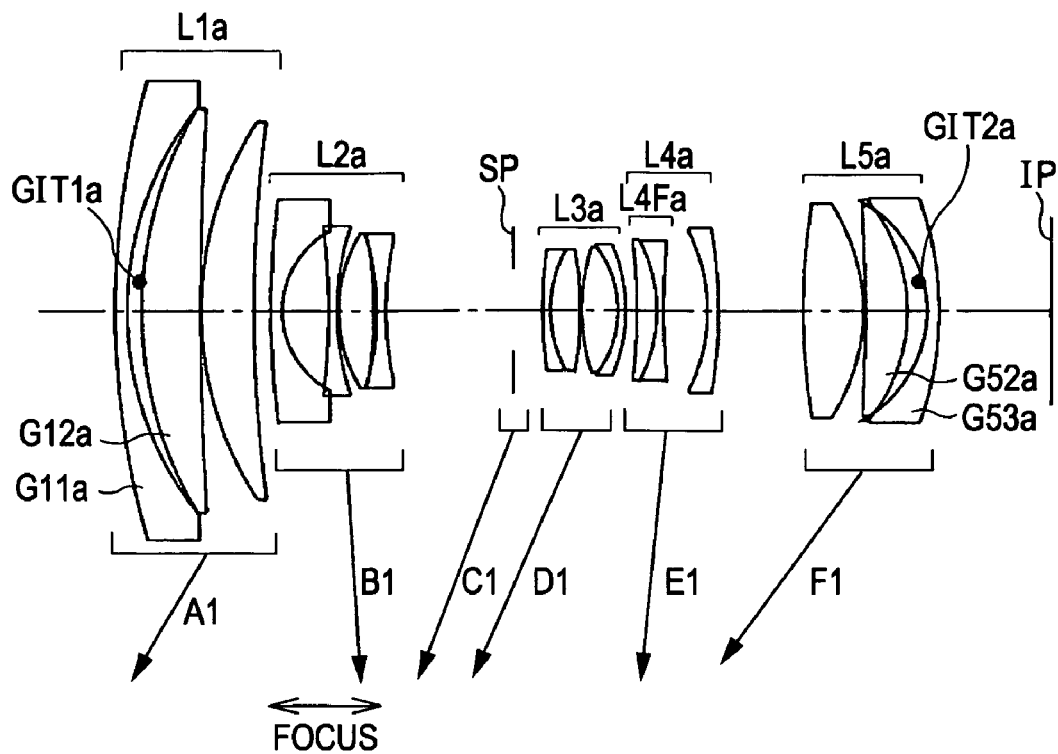
FIG. 1 is a lens cross-sectional view of a zoom lens according to an example 1 of at least one exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Hereinafter, description will be made regarding a zoom lens according to at least one exemplary embodiment and an image pickup apparatus including this.

Figure 2:
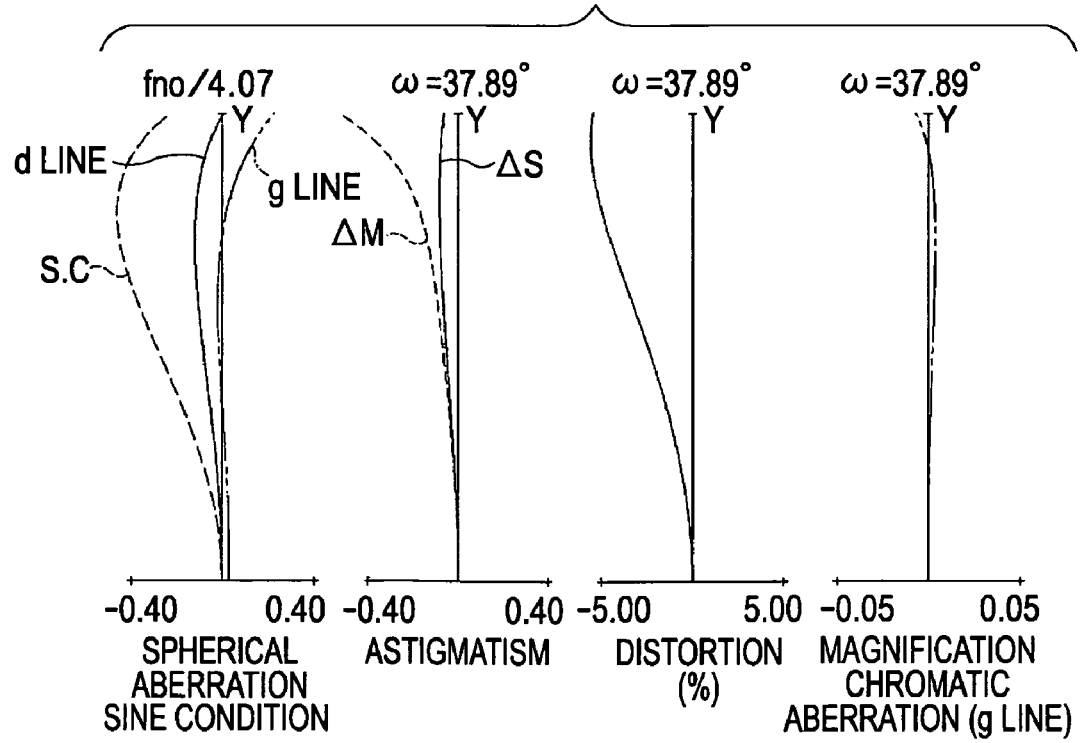
FIG. 2 is a chart of various aberrations at the wide-angle end of the zoom lens according to the example 1 of at least one exemplary embodiment.
Figure 3:
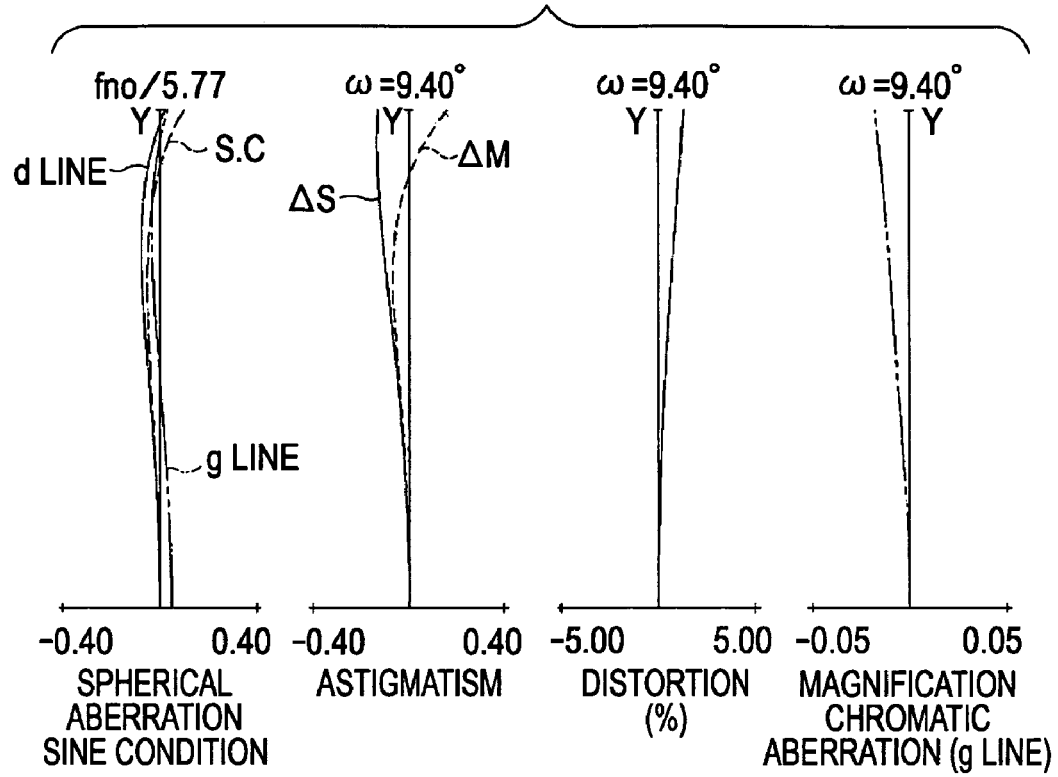
FIG. 3 is a chart of various aberrations at the telephoto end of the zoom lens according to the example 1 of at least one exemplary embodiment.

FIG. 1 is a lens cross-sectional view at the wide-angle end (short focal-length end) of a zoom lens according to an example 1 of at least one exemplary embodiment, and FIG. 2 and FIG. 3 are aberration charts at the wide-angle end and at the telephoto end (long focal-length end) of the zoom lens according to example 1 respectively.

Figure 4:
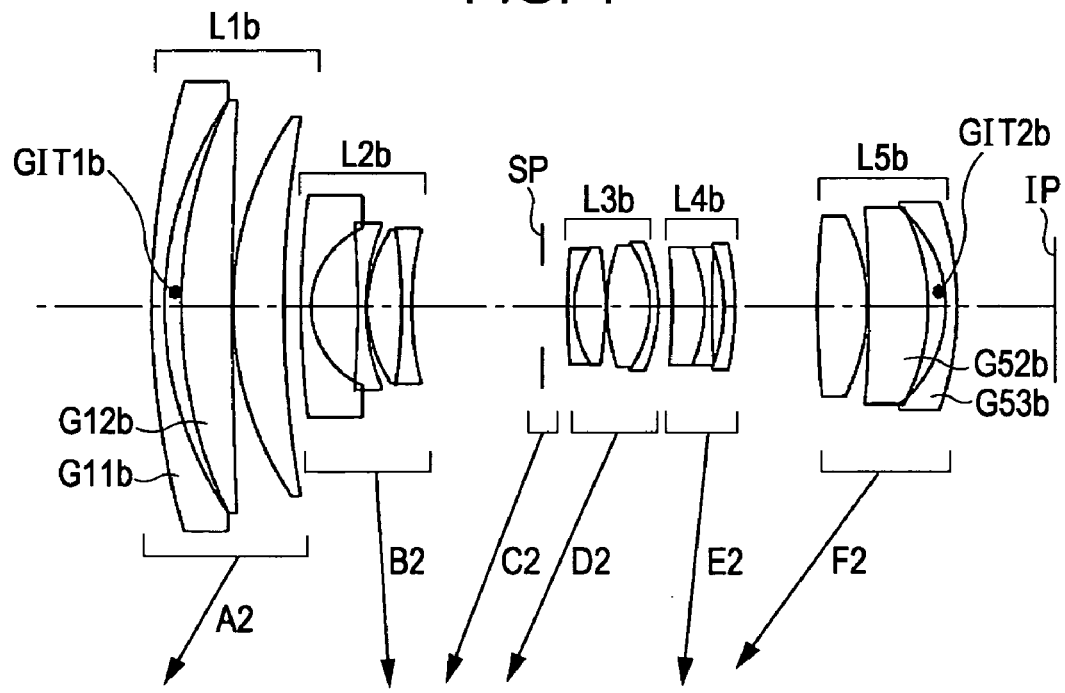
FIG. 4 is a lens cross-sectional view of a zoom lens according to an example 2 of at least one exemplary embodiment.
Figure 5:
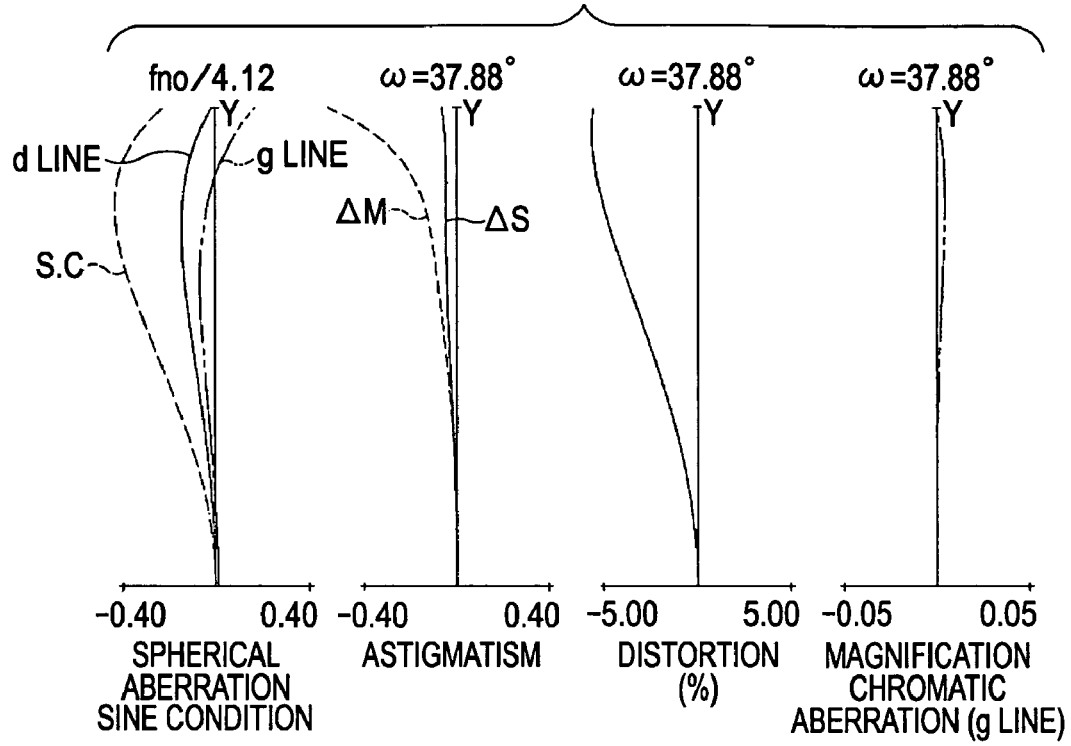
FIG. 5 is a chart of various aberrations at the wide-angle end of the zoom lens according to the example 2 of at least one exemplary embodiment.
Figure 6:
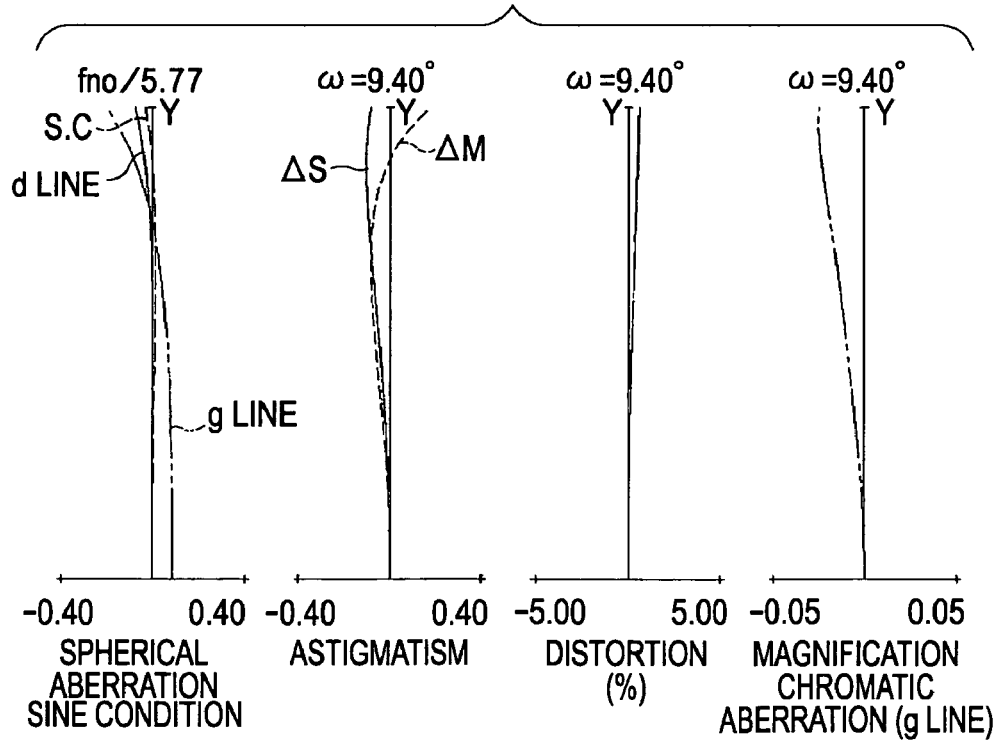
FIG. 6 is a chart of various aberrations at the telephoto end of the zoom lens according to the example 2 of at least one exemplary embodiment.

FIG. 4 is a lens cross-sectional view at the wide-angle end of a zoom lens according to an example 2 of at least one exemplary embodiment, and FIG. 5 and FIG. 6 are aberration charts at the wide-angle end and at the telephoto end of the zoom lens according to example 2 respectively.

Figure 7:
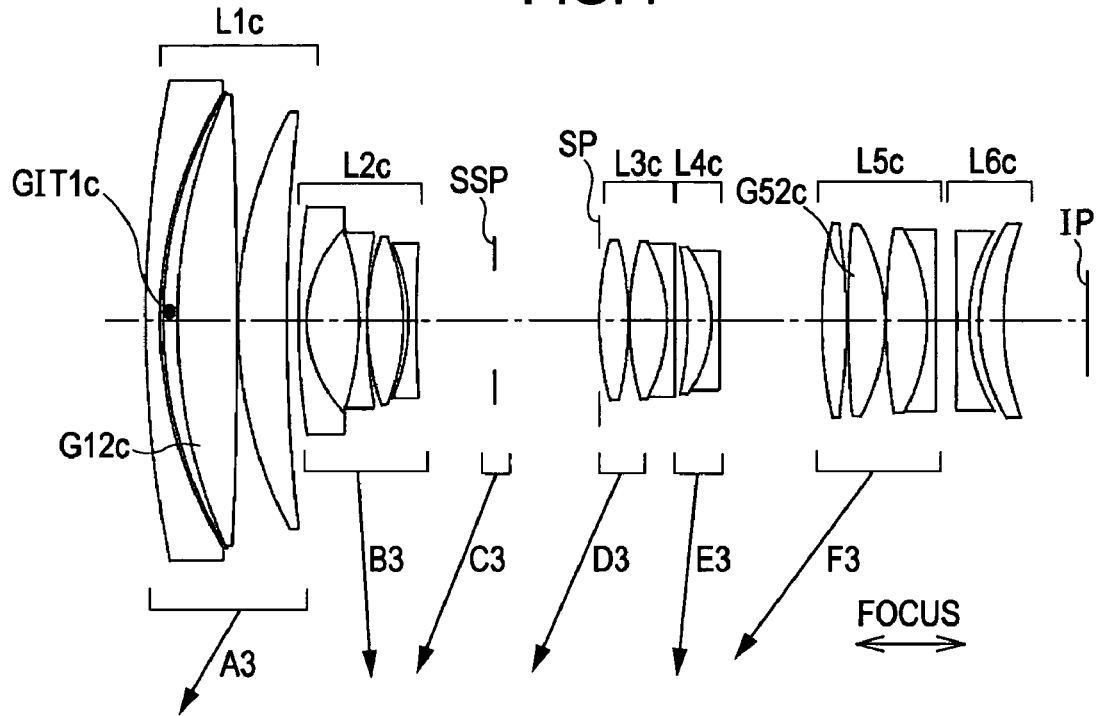
FIG. 7 is a lens cross-sectional view of a zoom lens according to an example 3 of at least one exemplary embodiment.
Figure 8:
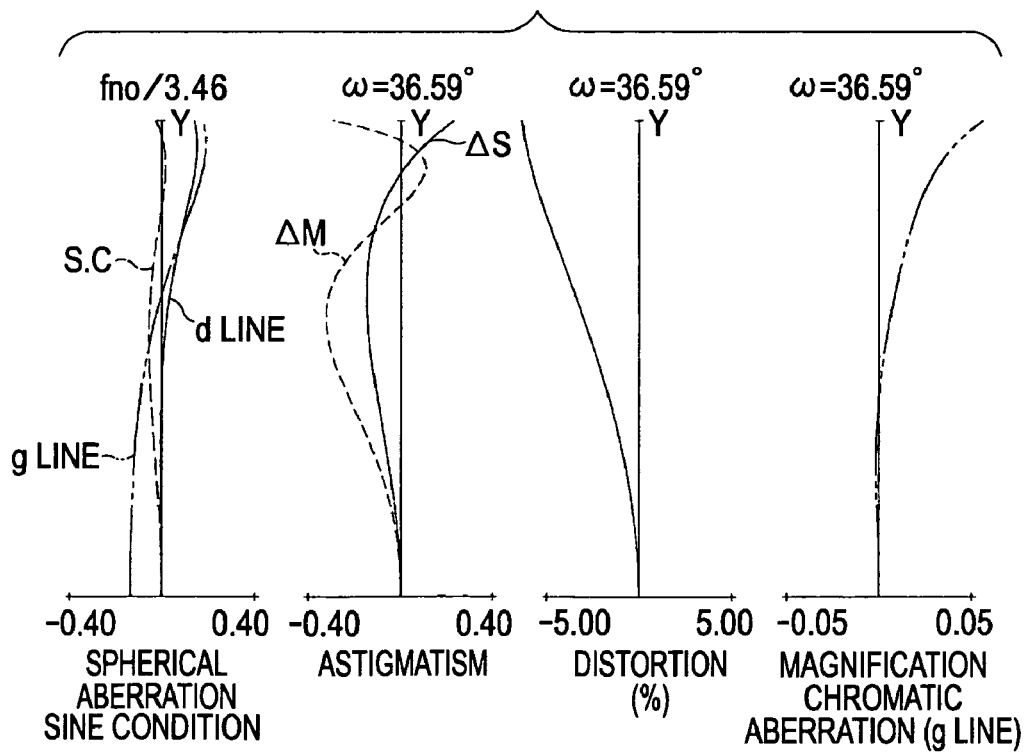
FIG. 8 is a chart of various aberrations at the wide-angle end of the zoom lens according to the example 3 of at least one exemplary embodiment.
Figure 9:
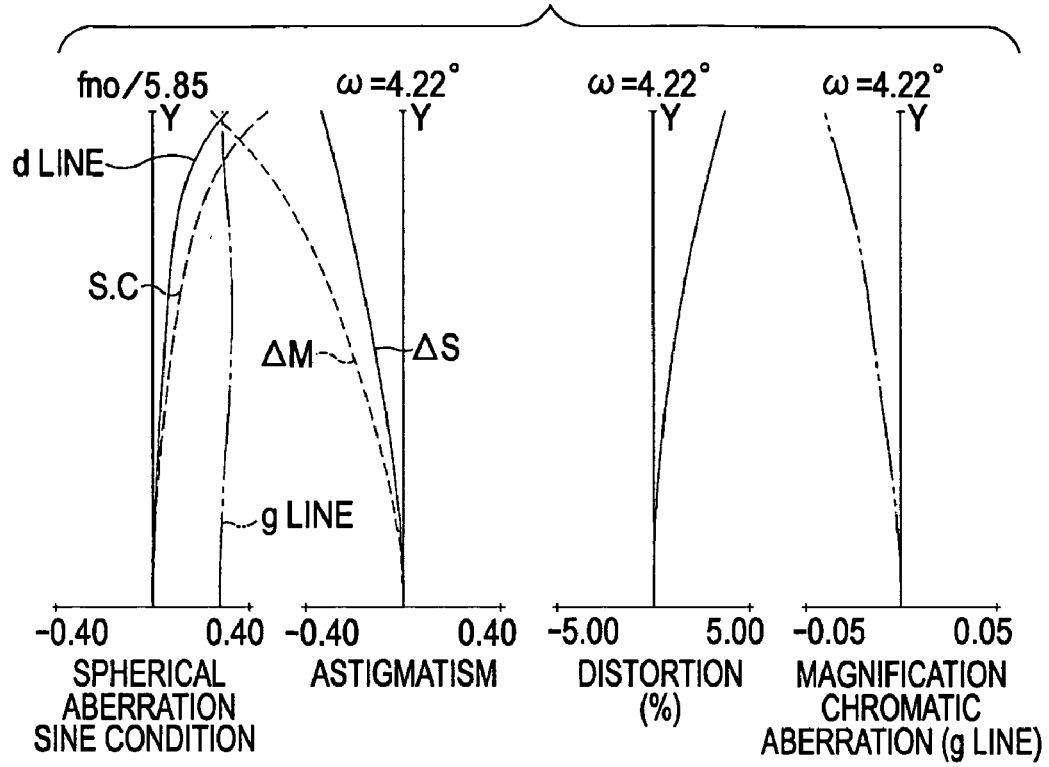
FIG. 9 is a chart of various aberrations at the telephoto end of the zoom lens according to the example 3 of at least one exemplary embodiment.

FIG. 7 is a lens cross-sectional view at the wide-angle end of a zoom lens according to an example 3 of at least one exemplary embodiment, and FIG. 8 and FIG. 9 are aberration charts at the wide-angle end and at the telephoto end of the zoom lens according to example 3 respectively.

Figure 10:
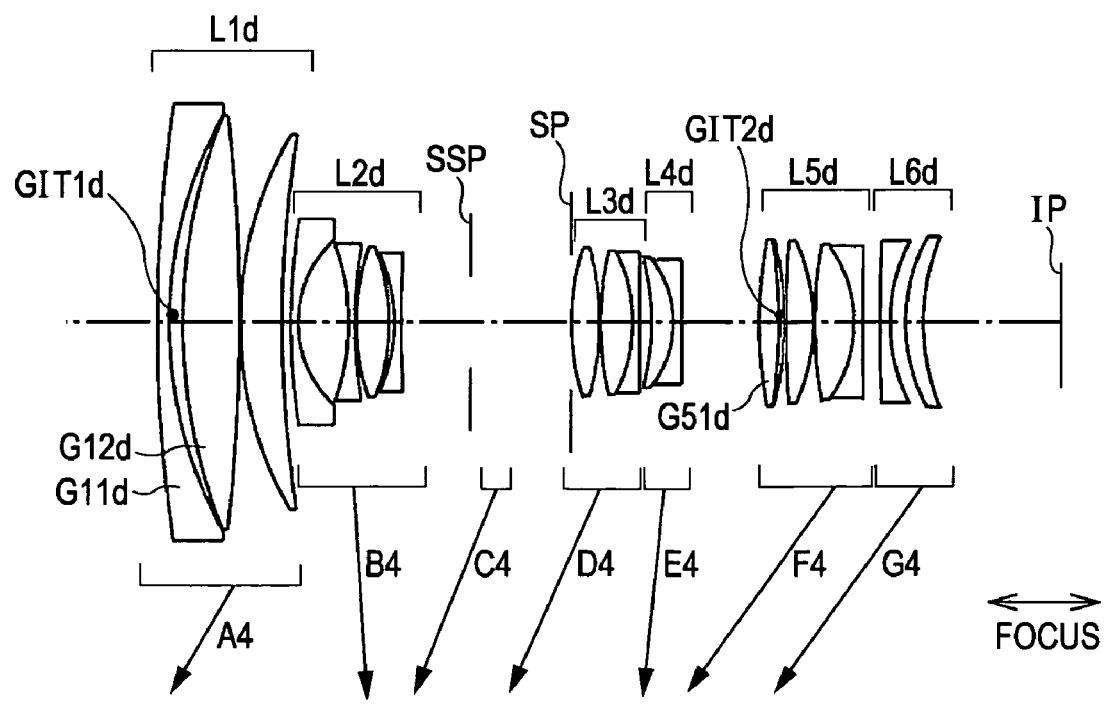
FIG. 10 is a lens cross-sectional view of a zoom lens according to an example 4 of at least one exemplary embodiment.
Figure 11:
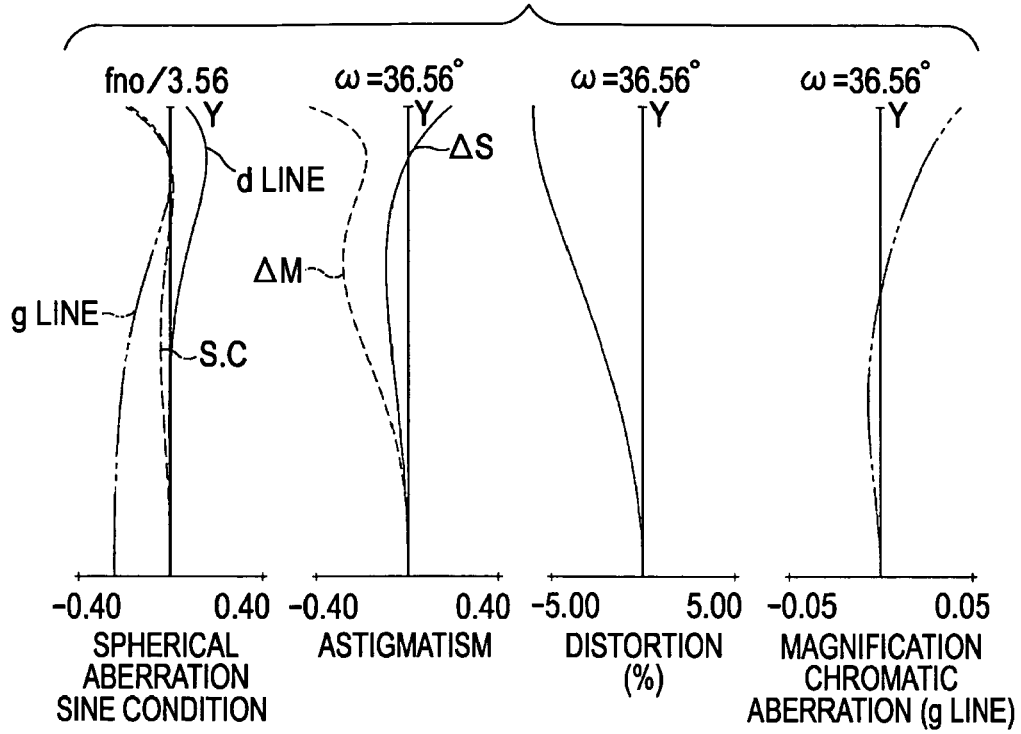
FIG. 11 is a chart of various aberrations at the wide-angle end of the zoom lens according to the example 4 of at least one exemplary embodiment.
Figure 12:
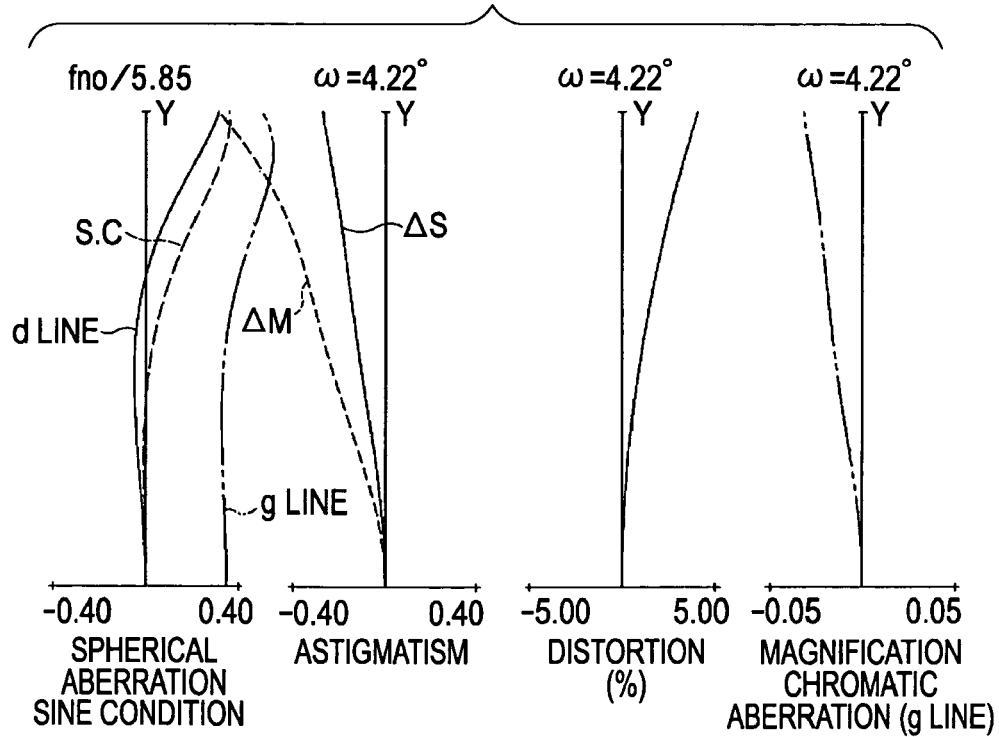
FIG. 12 is a chart of various aberrations at the telephoto end of the zoom lens according to the example 4 of at least one exemplary embodiment.

FIG. 10 is a lens cross-sectional view at the wide-angle end of a zoom lens according to an example 4 of at least one exemplary embodiment, and FIG. 11 and FIG. 12 are aberration charts at the wide-angle end and at the telephoto end of the zoom lens according to example 4 respectively.

Figure 13:
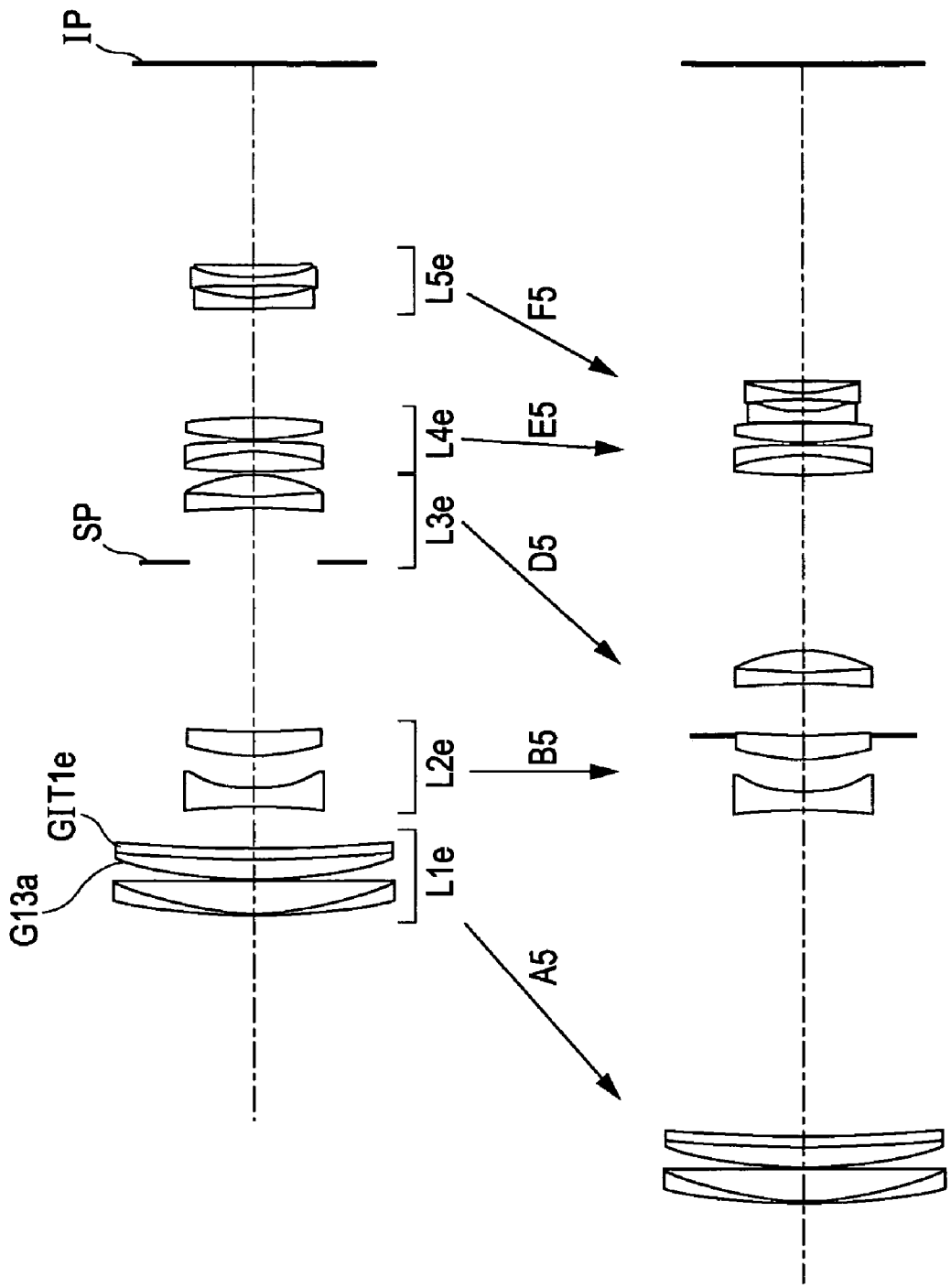
FIGS. 13A and 13B are lens cross-sectional views of a zoom lens according to an example 5 of at least one exemplary embodiment.
Figure 14:
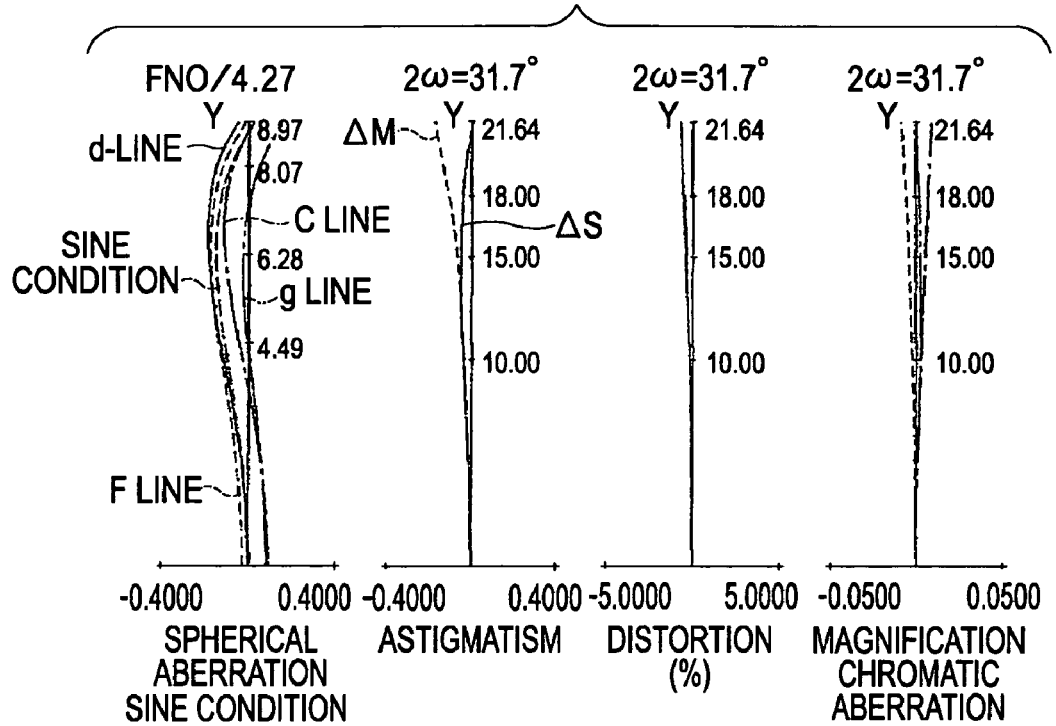
FIG. 14 is a chart of various aberrations at the wide-angle end of the zoom lens according to the example 5 of at least one exemplary embodiment.
Figure 15:
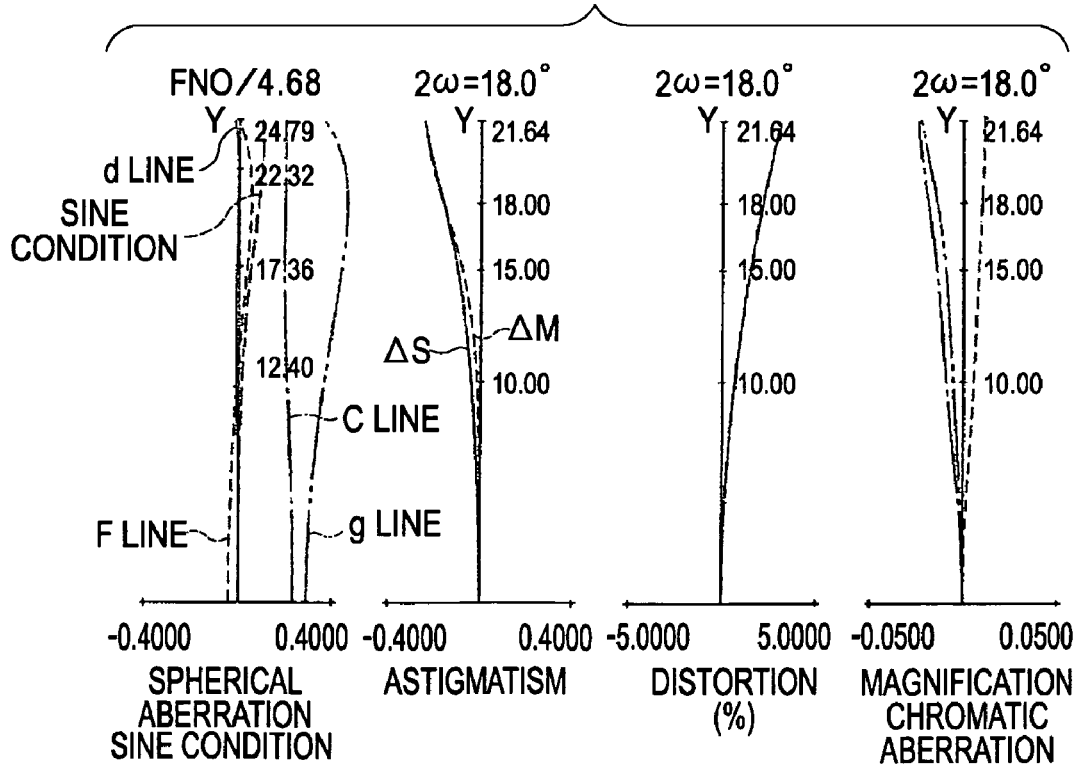
FIG. 15 is a chart of various aberrations at the telephoto end of the zoom lens according to the example 5 of at least one exemplary embodiment.

FIGS. 13A and 13B are lens cross-sectional views at the wide-angle end and at the telephoto end of a zoom lens according to an example 5 of at least one exemplary embodiment, and FIG. 14 and FIG. 15 are aberration charts at the wide-angle end and at the telephoto end of the zoom lens-according to example 5 respectively.

Figures 16A, 16B:
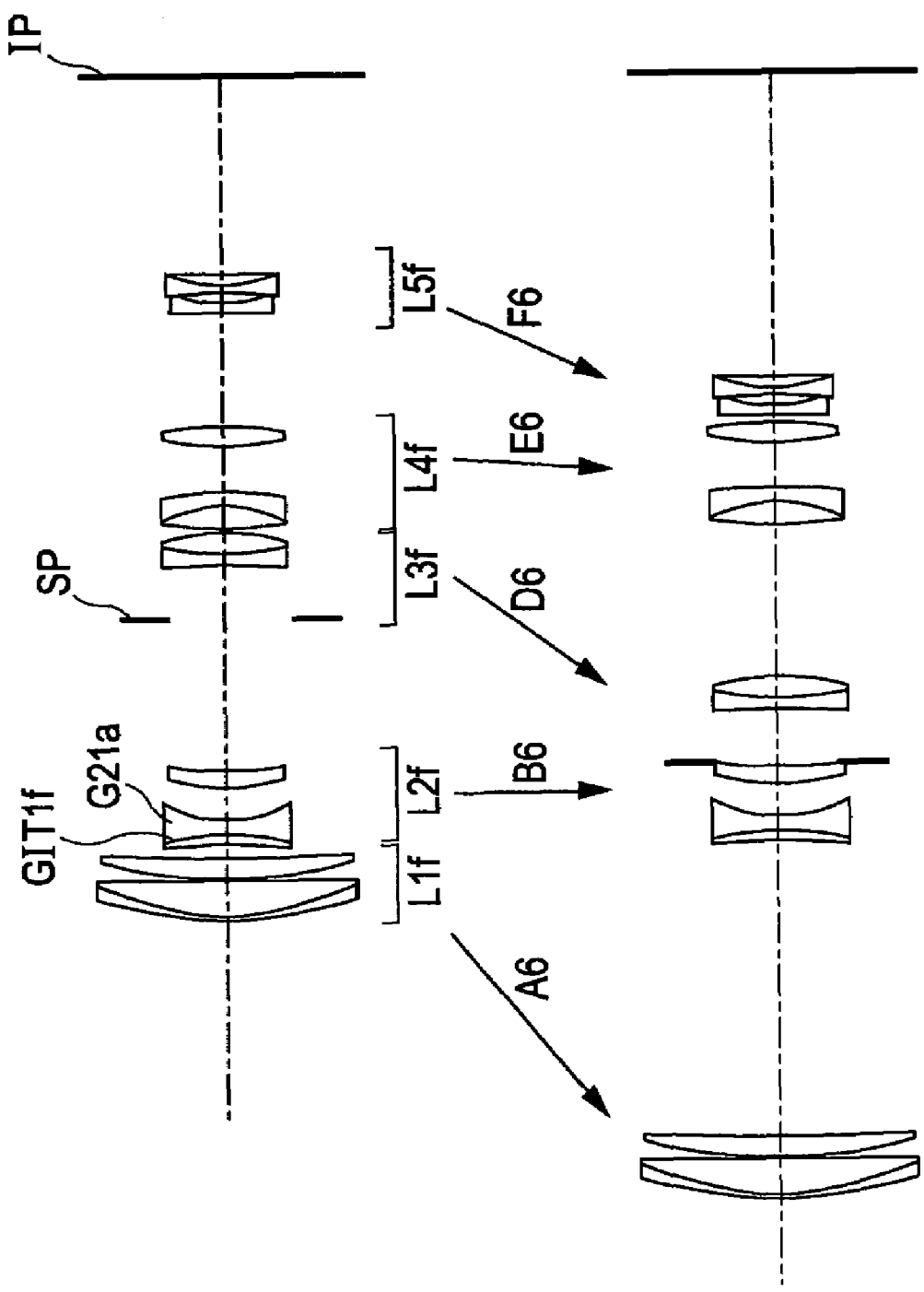
FIGS. 16A and 16B are lens cross-sectional views of a zoom lens according to an example 6 of at least one exemplary embodiment.
Figure 17:
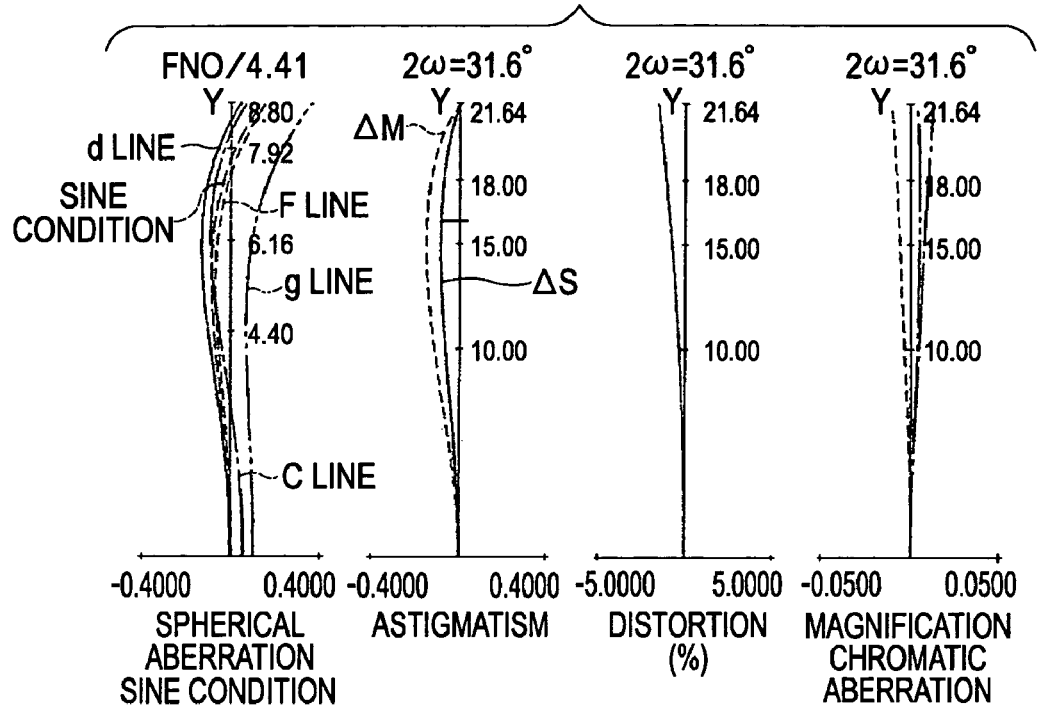
FIG. 17 is a chart of various aberrations at the wide-angle end of the zoom lens according to the example 6 of at least one exemplary embodiment.
Figure 18:
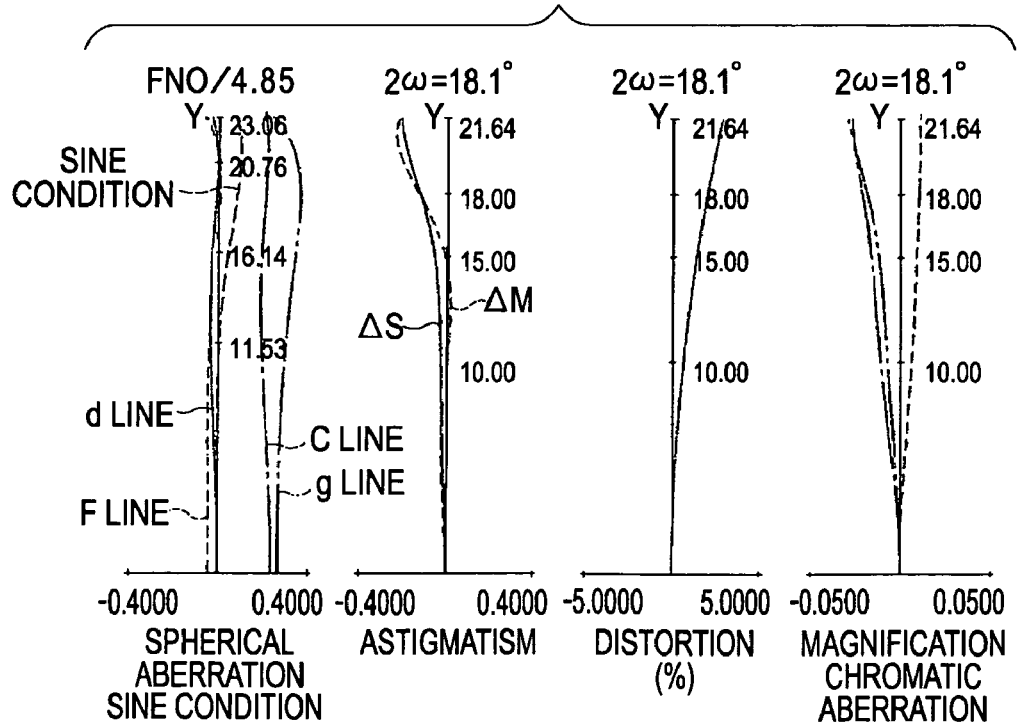
FIG. 18 is a chart of various aberrations at the telephoto end of the zoom lens according to the example 6 of at least one exemplary embodiment.

FIGS. 16A and 16B are lens cross-sectional views at the wide-angle end and at the telephoto end of a zoom lens according to an example 6 of at least one exemplary embodiment, and FIG. 17 and FIG. 18 are aberration charts at the wide-angle end and at the telephoto end of the zoom lens according to example 6 respectively.

Figure 19:
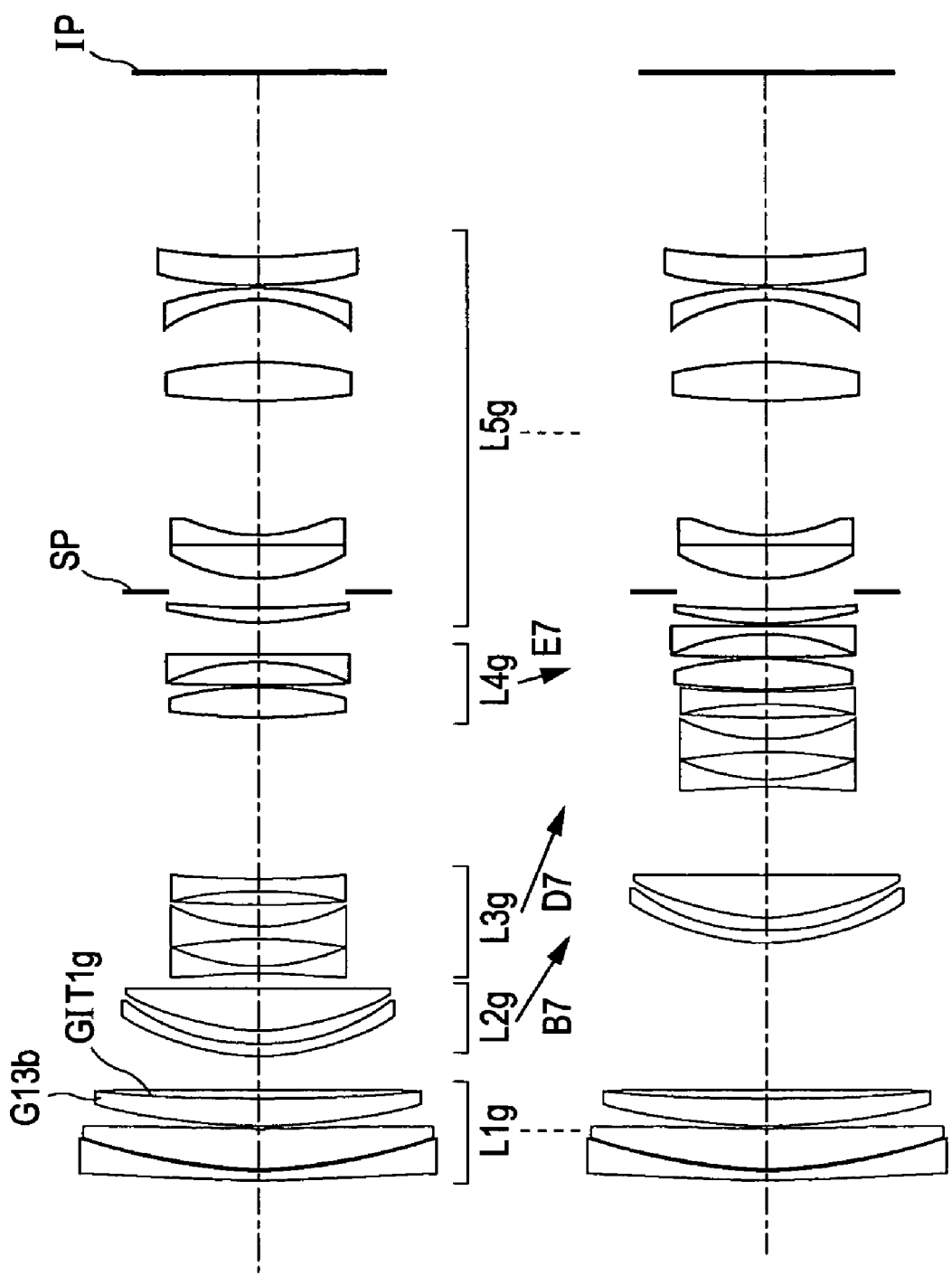
FIGS. 19A and 19B are lens cross-sectional views of a zoom lens according to an example 7 of at least one exemplary embodiment.
Figure 20:
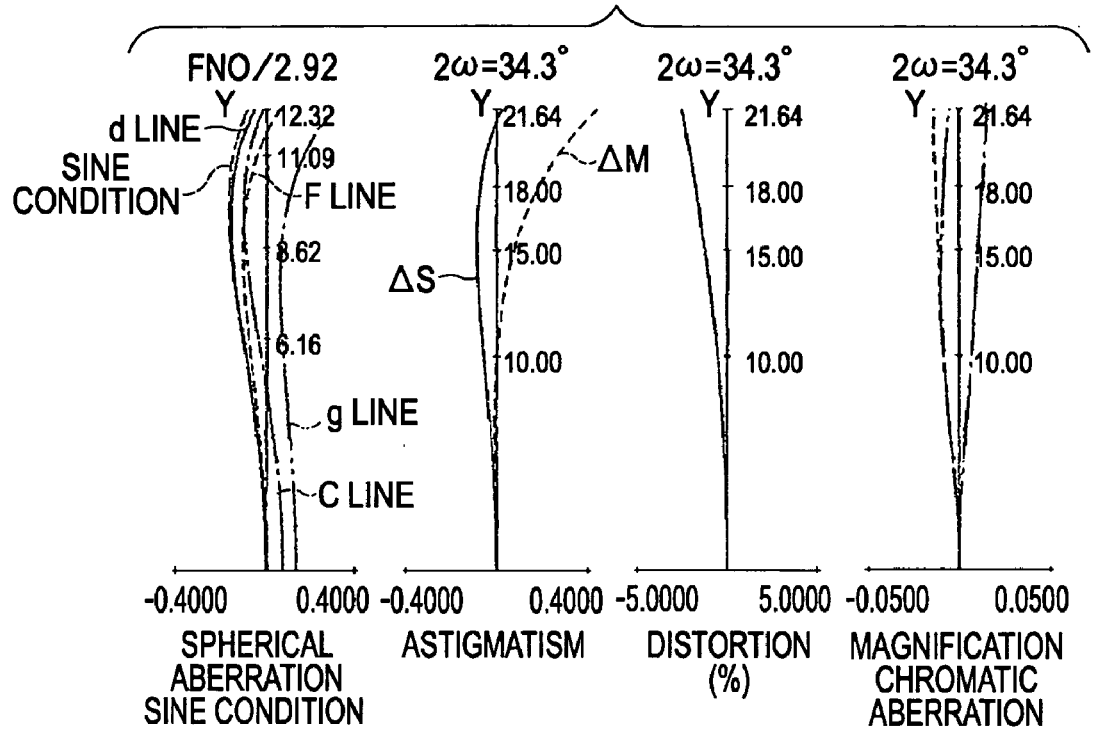
FIG. 20 is a chart of various aberrations at the wide-angle end of the zoom lens according to the example 7 of at least one exemplary embodiment.
Figure 21:
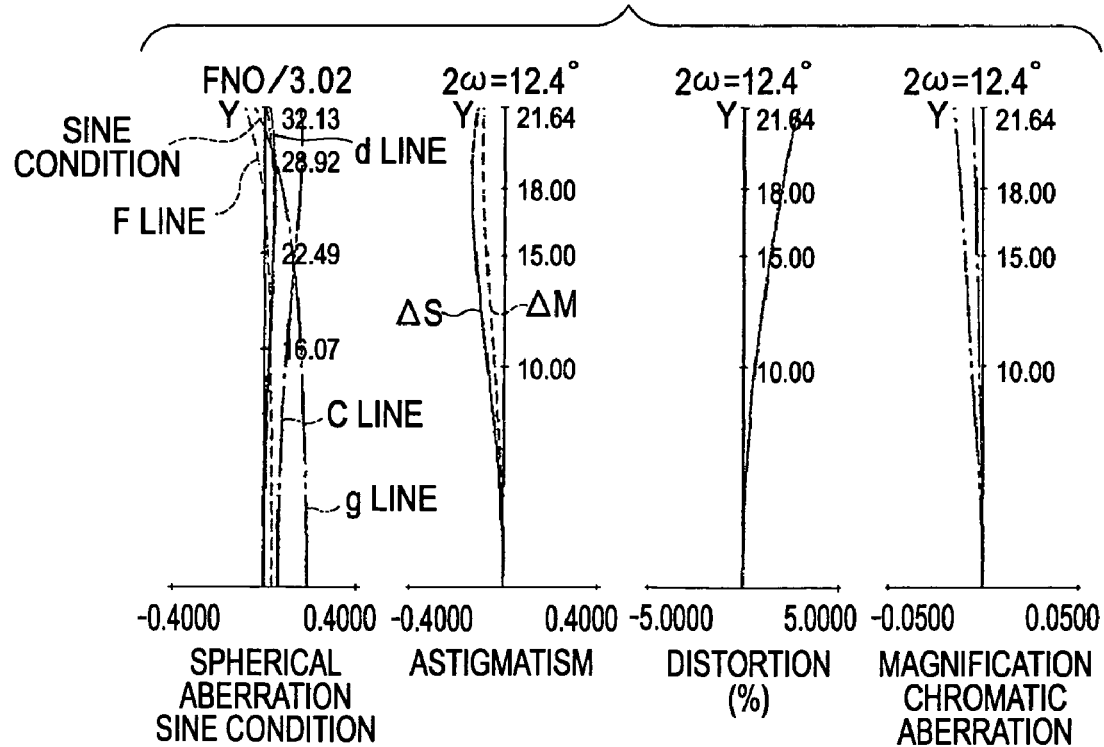
FIG. 21 is a chart of various aberrations at the telephoto end of the zoom lens according to the example 7 of at least one exemplary embodiment.

FIGS. 19A and 19B are lens cross-sectional views at the wide-angle end and at the telephoto end of a zoom lens according to an example 7 of at least one exemplary embodiment, and FIG. 20 and FIG. 21 are aberration charts at the wide-angle end and at the telephoto end of the zoom lens according to example 7 respectively.

Figures 22A, 22B:
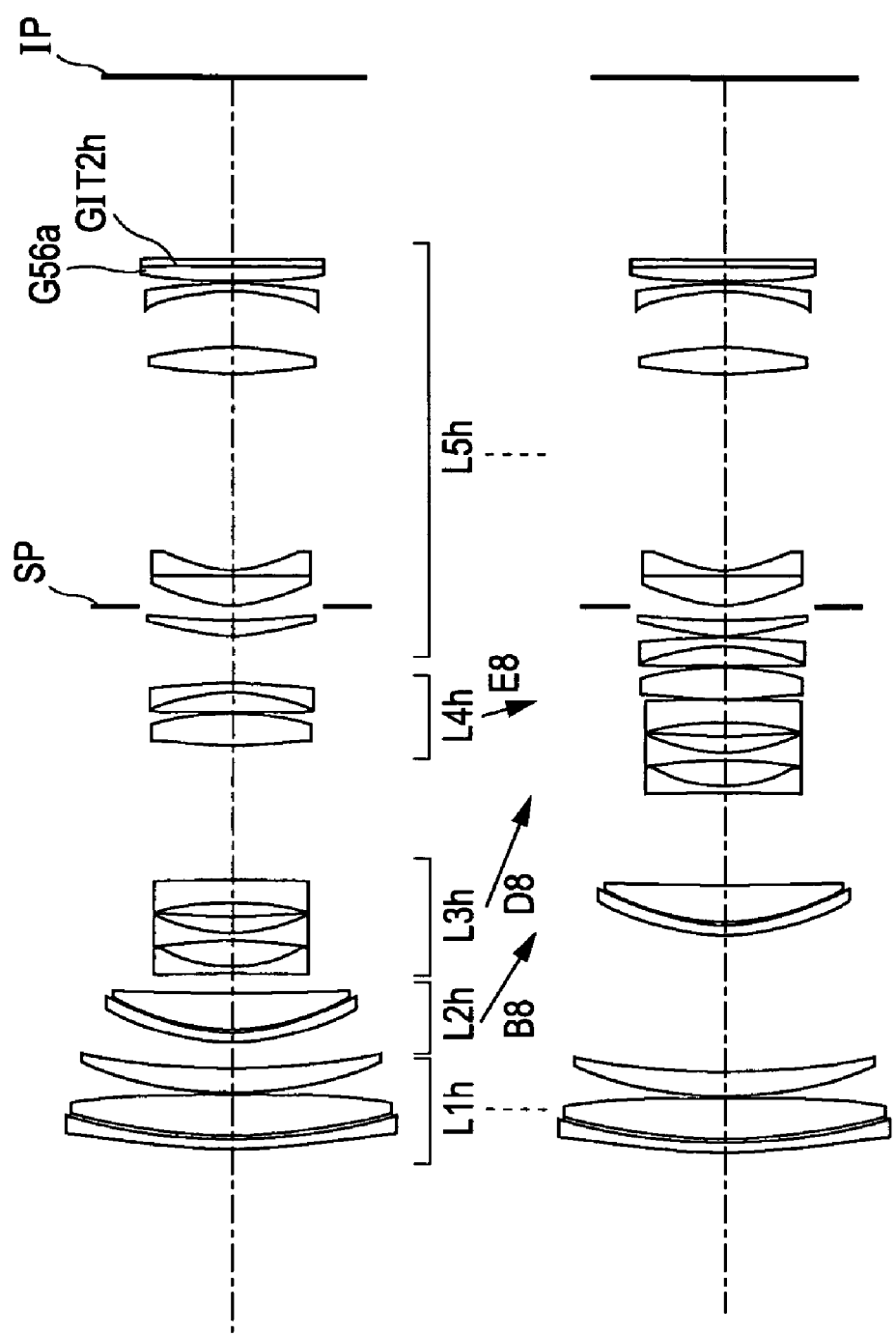
FIGS. 22A and 22B are lens cross-sectional views of a zoom lens according to an example 8 of at least one exemplary embodiment.
Figure 23:
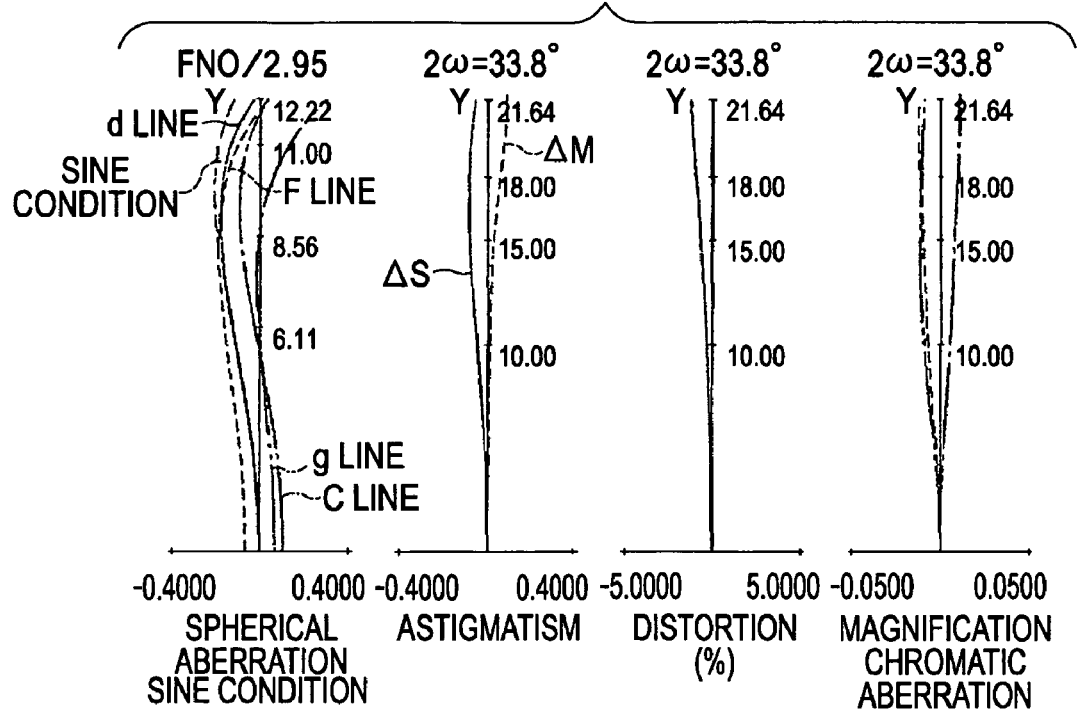
FIG. 23 is a chart of various aberrations at the wide-angle end of the zoom lens according to the example 8 of at least one exemplary embodiment.
Figure 24:
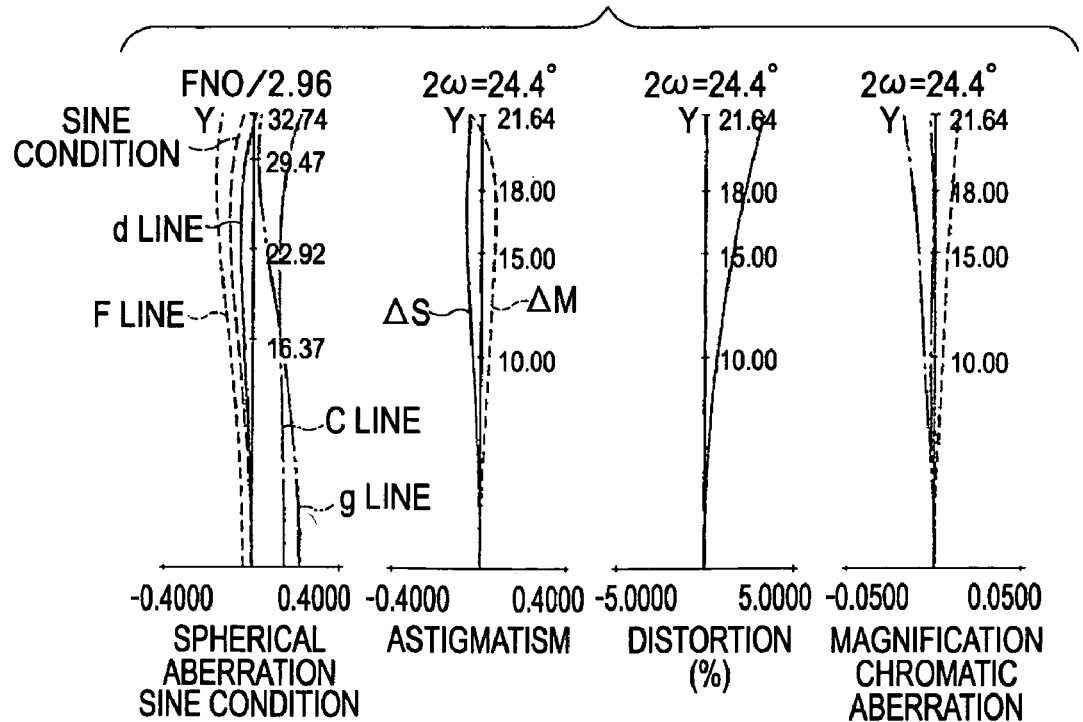
FIG. 24 is a chart of various aberrations at the telephoto end of the zoom lens according to the example 8 of at least one exemplary embodiment.

FIGS. 22A and 22B are lens cross-sectional views at the wide-angle end and at the telephoto end of a zoom lens according to an example 8 of at least one exemplary embodiment, and FIG. 23 and FIG. 24 are aberration charts at the wide-angle end and at the telephoto end of the zoom lens according to example 8 respectively.

Figure 25:
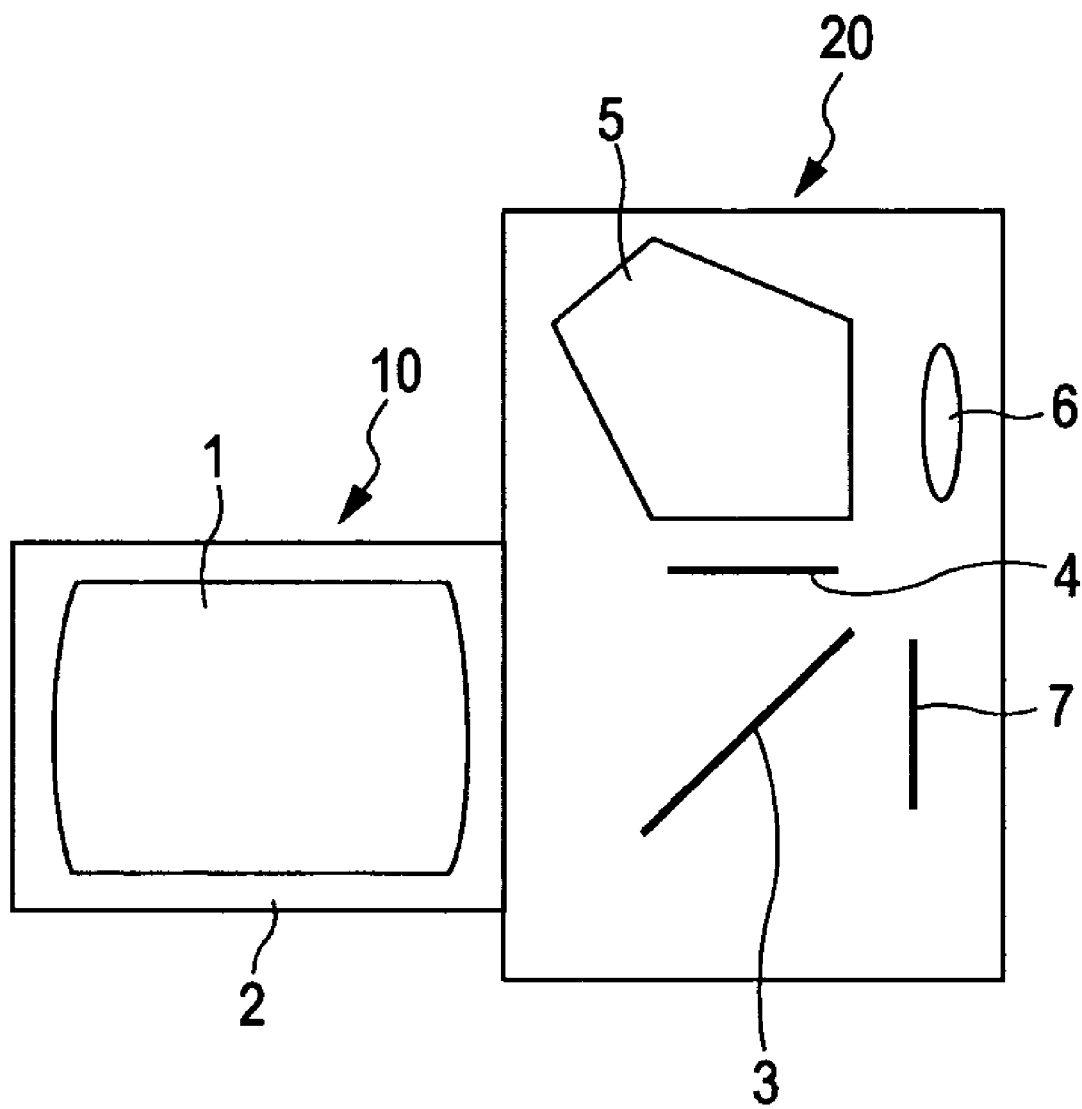
FIG. 25 is a principal part schematic view of an image pickup apparatus according to at least one exemplary embodiment.

FIG. 25 is a principal part schematic view of an image pickup apparatus according to at least one exemplary embodiment. The zoom lens according to at least one exemplary embodiment is a zoom lens employed for an image pickup apparatus such as a digital camera, video camcorder, and silver-salt camera, and optical equipment such as a telescope, binocular observation device, copying machine, projector, and other image pickup apparatus as known by one of ordinary skill in the relevant arts and equivalents.

With the lens cross-sectional views shown in FIGS. 1, 4, 7, 10, 13A, 13B, 16A, 16B, 19A, 19B, 22A, and 22B, the left hand side is the front (object side, enlarged side), and the right hand side is the rear (image side, reduced side).

The letter i represents the order when counting from the object side, and Li is the i-th lens unit. SP is an aperture stop for adjusting the amount of light, and IP is an image plane, and a photosurface equivalent to a solid-state image pickup device (photoelectric transfer device) such as a CCD sensor or CMOS sensor is disposed at the time of being employed as a photographic optical system of a video camcorder or digital still camera.

In the aberration charts, d and g represent a d-line and a g-line respectively, S·C represents a sine condition, ΔM and ΔS represent a meridional image surface and a sagittal image surface respectively, a chromatic aberration of magnification is represented with the g-line, fno is an F number, and ω is a half-angle of view. Note that the Y-axis in the spherical aberration's graph is entrance pupil radius, the Y-axis in the astigmatism's, distortions and chromatic aberration of magnification's graphs is image height.

Note that the wide-angle end and telephoto end according to each of the above examples refer to the zoom positions when a lens unit for variable power is mechanically positioned at both ends of a range movable on the optical axis.

The zoom lens according to each example is made up of a retrofocus-type optical system at the wide-angle end and a telephoto-type optical system at the telephoto end, and employs a solid material (under a room-temperature and ordinary-pressure condition), which can have a great (high) partial dispersion ratio satisfying at least one of the flowing conditional expressions (1) through (5) as a refractive optical element (optical member) having power (refracting power, inverse number of focal length).

Note that the term "refractive optical element" mentioned here refers to an element in which power is caused with refraction, for example, a refractive lens, layer, or other related or equivalent apparatus and/or methods as known by one of ordinary skill in the relevant art, but does not include a diffractive optical element in which power is caused with diffraction.

Also, a solid material refers to a solid material in a state when using the zoom lens, but a state prior to using the optical system such as a state at the time of manufacturing can be any state. For example, even if the solid material is a liquid material at the time of manufacturing, and this is converted into a solid material by hardening, such a material can correspond to the solid material mentioned here.

The retrofocus-type optical system at the wide-angle end refers to an optical system in which the height of a paraxial marginal ray passing through the most forward lens surface at the wide-angle end is smaller than the maximum value at the wide-angle end of the height, from the optical axis, of the paraxial marginal ray passing through the lens surface backward from the intersection between the optical axis and a paraxial chief ray.

Also, the telephoto-type optical system at the telephoto end refers to an optical system in which the maximum value at the telephoto end of the height, from the optical axis, of a paraxial marginal ray passing through the lens surface further forward than the intersection between the optical axis and a paraxial chief ray is greater than the maximum value at the telephoto end of the height, from the optical axis, of the paraxial marginal ray passing through the lens surface backward from the intersection between the optical axis and the paraxial chief ray.

The Abbe number and partial dispersion ratio of an optical member employed for the zoom lens according to each example are as follows.

Now, when assuming that the refractive indices corresponding to the g-line, F-line, d-line, and C-line serving as Fraunhofer lines are Ng, NF, Nd, and NC respectively, the definitions of the Abbe number vd, partial dispersion ratios θgd, and θgF are the same as those commonly used, and are represented as follows.

$vd = (Nd-1)/(NF-1)$ $\theta gd = (Ng-Nd)/(NF-NC)$ $\theta gF = (Ng-NF)/(NF-NC)$ The zoom lens of each example is an optical system in which the maximum value at the telephoto end of the height, from the optical axis, of a paraxial marginal ray passing through the lens surface further forward than the intersection between the optical axis and a paraxial chief ray is greater than the maximum value at the telephoto end of the height, from the optical axis, of the paraxial marginal ray passing through the lens surface backward from the intersection between the optical axis and the paraxial chief ray. The zoom lens of each exemplary embodiment includes a refractive optical element GIT having positive refracting power made up of a solid material satisfying one or more of the following conditions:

$$-2.100 \times 10^{-3} \cdot vd + 0.693 < \theta gF \quad (1)$$

$$0.555 < \theta gF < 0.9 \quad (2)$$

$$-2.407 \times 10^{-3} \cdot vd + 1.420 < \theta gd \quad (3)$$

$$1.255 < \theta gd < 1.67 \quad (4)$$

$$vd < 60 \quad (5)$$

where the light incident side and the light emission side are both on the refractive surface, vd is an Abbe number, θgF and θgd are partial dispersion ratios. Note that the refracting power of the refractive optical element GIT refers to the refracting power by the element itself when assuming that the light incident surface and the light emission surface of the refractive optical element GIT are the air.

With each example, appropriate correction of a chromatic aberration straddling the wide wavelength bandwidth of the g-line through C-line is performed by employing the solid material satisfying the conditions (1) and (2) within the optical system as a refractive optical element. Also, satisfying the conditions (3) and (4) enables chromatic aberration correction between the g-line and d-line to be performed. This facilitates chromatic aberration correction more accurately at the wavelength bandwidth of the g-line through C-line.

Also, each of the examples further can satisfy the conditional expression (5) from the perspective of chromatic aberration correction.

Specific examples of the solid material (hereinafter, also referred to as "optical material") which can satisfy the conditional expressions (1) and (2) can include a resin. Of various resins, particularly a UV hardening resin (Nd=1.635, vd=22.7, θgF=0.69) and N-polyvinyl carbazole (Nd=1.696, vd=17.7, θgF=0.69) are optical materials satisfying the conditional expressions (1) and (2). Note that the optical material is not restricted to these, so any resin can be employed as long as the resin satisfies the conditional expressions (1) and (2).

Also, there can be a mixture in which the following inorganic oxide nano particulates are dispersed within a transparent synthetic resin as an optical material having properties different from a common nitrifying material. That is to say, examples of inorganic oxide nano particulates include $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), and $BaTiO_3$ (Nd=2.4362, vd=11.3).

Of these inorganic oxides, dispersing $TiO_2$ (Nd=2.304, vd=13.8, θgF=0.87) particulates within a synthetic resin with a suitable volume ratio enables the optical material satisfying the above conditional expressions (1) and (2) to be obtained.

$TiO_2$ is a material employed for various applications, and with the optical field, this is employed as a material for evaporation making up an optical thin film such as an antireflective film. In addition, $TiO_2$ particulates are also employed as a cosmetic material such as a photocatalyst or white pigment.

With each example, the average diameter of $TiO_2$ particulates can vary and be dispersed within a resin, for example the particles can be about 2 nm through 50 nm or so, and can influence light for example via diffusion. Additionally a dispersant can be added to suppress agglomeration.

As for a medium material for dispersing $TiO_2$, a polymer can be employed, which can provide high mass productivity by being subjected to photopolymerization molding or thermal polymerization using forming mold.

Also, as for the properties of the optical constant of a polymer, a polymer which can have a relatively large partial dispersion ratio, a polymer which can have a relatively small Abbe number, or a polymer satisfying both can be employed, N-polyvinyl carbazole, styrene, polymethylmethacrylate (acrylic), can be applied. With later-described examples, a UV hardening resin and N-polyvinyl carbazole are employed as a host polymer for dispersing $TiO_2$ particulates. However, the host polymer is not restricted to these.

The dispersion properties $N(\lambda)$ of a mixture in which nano particulates are dispersed can be simply calculated with the following expression derived from the well-known Drude expression. That is to say, the refractive index $N(\lambda)$ in a wavelength $\lambda$ is as follows:

$$N(\lambda)=[1+V\{N_{TiO}^2(\lambda)-1\}+(1-V)\{N_p^2(\lambda)-1\}]^{1/2}$$

Here, $\lambda$ is an arbitrary wavelength, $N_{TiO}$ is the refractive index of $TiO_2$, $N_p$ is the refractive index of a polymer, and V is the fraction of the gross volume of $TiO_2$ particulates as to the volume of a polymer.

The numerical ranges of the conditional expressions (1) through (5) can be set as follows:

$$-1.682\times10^{-3}\cdot vd+0.7<\theta gF<-1.682\times10^{-3}\cdot vd+0.756 \quad (1a)$$

$$0.555<\theta gF<0.8 \quad (2a)$$

$$-2.076\times10^{-3}\cdot vd+1.426<\theta gd<-2.076\times10^{-3}\cdot vd+1.512 \quad (3a)$$

$$1.255<\theta gd<1.54 \quad (4a)$$

$$vd<40 \quad (5a)$$

With the zoom lens of each example, when assuming that the entire optical lengths at the wide-angle end and at the telephoto end (distance from the most forward first lens surface to the image surface) are OTLw and OTLt respectively, and the focal lengths at the wide-angle end and at the telephoto end of the zoom lens are fw and ft respectively, this satisfies one or more of the following conditions:

$$0.5<OTLt/ft<2.2 \quad (6)$$

$$1.9<OTLw/fw<10 \quad (7)$$

$$1\leq OTLt/OTLw<2 \quad (8)$$

With the zoom lens according to at least one exemplary embodiment, when the entire optical length at the wide-angle end and at the telephoto end and the optical entire length ratio at the wide-angle end and at the telephoto end are appropriately set, and the refractive optical element made up of the material satisfying the above conditional expressions (1) through (5) can be employed within the optical system, the conditional expressions (6) through (8) enable correction of a chromatic aberration straddling the entire zoom range to be performed appropriately.

Exceeding the upper limits or lower limits of the conditional expressions (6) through (8) makes it difficult to correct chromatic aberration appropriately when employing the refractive optical element made up of a material which can satisfy the above conditional expressions (1) through (5).

The numerical ranges of the conditional expressions (6) through (8) can be set as follows:

$$0.6<OTLt/ft<2.0 \quad (6a)$$

$$2.0<OTLw/fw<9 \quad (7a)$$

$$1\leq OTLt/OTLw<1.8 \quad (8a)$$

A refractive optical element G can satisfy the following conditions $$-1.500\times10^{-3}\cdot vd+0.6425<\theta gF \quad (9)$$

$$vd<60 \quad (10)$$

is provided either further forward or backward from the intersection between the optical axis and a paraxial chief ray, and also a refractive optical element GIT having positive refracting power satisfying one or more of the above conditions (1) through (5) is provided on the other side.

Employing the refractive optical element G satisfying the conditions (9) and (10) facilitates correction of a chromatic aberration straddling the entire zoom range.

When assuming that the focal length of the refractive optical element GIT having positive refracting power is fGIT, and the focal length at the wide-angle end of the above zoom lens is fw, and the focal length at the telephoto end of the above zoom lens is ft, the following condition

[Equation 11]

$$0.5<fGIT/\sqrt{(fw\times ft)}<20 \quad (11)$$

can be satisfied.

Upon the focal length of the refractive optical element GIT exceeding the lower limit of the conditional expression (11) to be shorter than the square root of the focal length at the wide-angle end and the focal length at the telephoto end of the entire system, the correction effects of a chromatic aberration using the extraordinary dispersion properties of the refractive optical element GIT are excessively provided, and inversely, the chromatic aberration becomes great. Also, upon the focal length of the refractive optical element GIT exceeding the upper limit of the conditional expression (11) to be longer than the square root of the focal length at the wide-angle end and the focal length at the telephoto end of the entire system, the correction effects of a chromatic aberration using the extraordinary dispersion properties of the refractive optical element GIT are reduced unfavorably.

The numerical range of the conditional expression (11) can be set as follows:

[Equation 11a]

$$0.6<fGIT/\sqrt{(fw\times ft)}<15 \quad (11a)$$

When both forward and backward of an intersection P between the optical axis and a paraxial chief ray each includes the refractive optical element GIT having positive refracting power, if we say that the focal length of the refractive optical element GIT1 having positive refracting power disposed further forward than the point P is fGIT1, and the focal length of the refractive optical element GIT2 having positive refracting power disposed backward from the point P is fGIT2, the following conditions (12) and (13)

$$1.0<fGIT1/\sqrt{(fw\times ft)}<10 \quad (12)$$

$$1.3<fGIT2/\sqrt{(fw\times ft)}<3 \quad (13)$$

can be satisfied.

According to the same reason as the description of the conditional expression (11), this case realizes the zoom lens having appropriate optical capabilities for suppressing the secondary spectrum of a chromatic aberration of magnification to small by satisfying the conditional expressions (12) and (13).

Deviating from the conditional expressions (12) and (13) unfavorably makes it difficult to correct chromatic aberration of magnification.

The numerical ranges of the conditional expressions (12) and (13) can be set as follows:

$$1.1 < fGIT1/\sqrt{(fw \times ft)} < 9 \quad (12a)$$

$$1.5 < fGIT2/\sqrt{(fw \times ft)} < 2.5 \quad (13b)$$

When assuming that the focal lengths of the first lens unit L1 and the second lens unit L2 are f1 and f2 respectively, and the focal lengths at the wide-angle end and at the telephoto end are fw and ft respectively, the following conditions $$0.6 < f1/\sqrt{(fw \times ft)} < 2 \quad (14)$$

$$0.1 < |f2|/\sqrt{(fw \times ft)} < 0.7 \quad (15)$$

can be satisfied.

The conditional expression (14) is for stipulating the focal length of the first lens unit L1 as to the square root of the focal lengths at the wide-angle end and at the telephoto end of the entire system. Upon the positive refracting power of the first lens unit L1 exceeding the lower limit to be strengthened, this is advantageous to reduction of the entire optical length, but this causes various aberrations generated from each lens unit to be increased, and makes it difficult to correct these in a balanced manner. On the other hand, upon the positive refracting power of the first lens unit L1 exceeding the upper limit to be weakened, this unfavorably causes the entire optical length to be lengthened.

The conditional expression (15) is for stipulating the absolute value of the focal length of the second lens unit L2 as to the square root of the focal lengths at the wide-angle end and at the telephoto end of the entire system. Upon the negative refracting power of the second lens unit L2 exceeding the lower limit to be strengthened, this is advantageous to reduction of the entire optical length, but this causes various aberrations generated from each lens unit to be increased, and makes it difficult to correct these in a balanced manner. On the other hand, upon the negative refracting power of the second lens unit L2 exceeding the upper limit to be weakened, this unfavorably causes the entire optical length to be lengthened.

The numerical ranges of the conditional expressions (14) through (15) can be set as follows:

$$0.7 < f1/\sqrt{(fw \times ft)} < 1.8 \quad (14a)$$

$$0.15 < |f2|/\sqrt{(fw \times ft)} < 0.6 \quad (15a)$$

When both forward and backward of the aperture stop SP include the refractive optical element GIT having positive refracting power, if we say that the focal length of the refractive optical element GIT1 having positive refracting power disposed further forward than the aperture stop SP is fGIT1, the focal length of the refractive optical element GIT2 having positive refracting power disposed backward from the aperture stop SP is fGIT2, the focal length of the lens unit including the relevant refractive optical element GIT1 is f1, and focal length of the lens unit including the relevant refractive optical element GIT2 is f2, the following conditions $$0 < \frac{f1}{fGIT1} < 1.3 \quad (16)$$

$$0 < \frac{f2}{fGIT2} < 1.2 \quad (17)$$

can be satisfied.

This case obtains high optical capabilities straddling the entire zoom range of which the chromatic aberration is appropriately corrected while suppressing the secondary spectrum of a chromatic aberration of magnification to small by satisfying the conditional expressions (16) and (17).

Deviating from the conditional expressions (16) and (17) makes it difficult to correct chromatic aberration of magnification.

The numerical ranges of the conditional expressions (16) and (17) can be set as follows:

When assuming that the absolute value of the rate of change as to the temperature of the refractive index of the d-line within a range of 0 through 40 degrees of the solid material making up the refractive optical element GIT is |dn/dT|, the following condition $$|dn/dT| < 2.5 \times 10^{-4}/°C. \quad (18)$$

can be satisfied.

Deviating from the conditional expression (18) unfavorably causes the optical capabilities to be changed greatly when a temperature changes under an environment in which the zoom lens is used.

Next, description will be made regarding the features of each example.

FIG. 1 is a lens cross-sectional view at a zoom position at the wide-angle end of a numerical example 1 equivalent to the example 1.

The zoom lens in FIG. 1 comprises a first lens unit L1a having positive refracting power, a second lens unit L2a having negative refracting power, an aperture stop SP, a third lens unit L3a having positive refracting power, a fourth lens unit L4a having negative refracting power, and a fifth lens unit L5a having positive refracting power in order from the object side to the image side. When zooming from the wide-angle end to the telephoto end, the first lens unit L1a is moved (A1) to the object side, the second lens unit L2a is moved (B1) to the image side, and the third lens unit L3a, fourth lens unit L4, and fifth lens unit L5 are moved (D1, E1, and F1 respectively) to the object side while changing the space gap sandwiched with the respective lens units.

Of the first lens unit L1a, a refractive optical element GIT1a can be made up of a UV hardening resin is employed between a lens G11a on the most object side and a lens G12a on the image side thereof. This UV hardening resin also serves as a function of an adhesive agent. Also, of the fifth lens unit L5a, a refractive optical element GIT2 made up of a UV hardening resin is employed between a lens G53a on the most image side and a lens G52a on the object side thereof, and this UV hardening resin also serves as a function of an adhesive agent.

Generally, UV hardening resins have properties of swelling due to moisture absorption, so the deterioration of optical capabilities due to change in an environment is suppressed by sandwiching both sides of the UV hardening resin, as illustrated in the example 1.

Note that with the example 1, focusing from an infinite-distance object to a close object is performed by sending out the second lens unit L2a to the object side. Also, of the fourth lens unit L4a, an image position is shifted by subjecting a combination (e.g., cemented) lens L4Fa positioned on the object side to displacement so as to have components in the direction perpendicular to the optical axis, restricting thereby deterioration of an image due to camera shake.

With the refractive optical elements GIT1a and GIT2a, the positive refracting power is equivalent to the result of obtained by calculating both sides (light incident side) thereof as the air. The refractive optical element GIT1a has a function for reducing the secondary spectrum of a chromatic aberration of magnification at a zoom position on the telephoto side. The refractive optical element GIT2a has a function for reducing the secondary spectrum of a chromatic aberration of magnification at a zoom position on the wide-angle side.

As described above, the secondary spectrum of a chromatic aberration of magnification straddling the entire focal length (entire zoom range) can be reduced by employing the refractive optical element made up of a material having extraordinary dispersion properties on both the object side and the image surface side of the aperture stop SP.

Further, employing the UV hardening resin as an extraordinary dispersion material enables the thickness to be thinned as compared to the conventional material such as fluorite, thereby facilitating downsizing of the entire lens system.

FIG. 4 is a lens cross-sectional view at a zoom position at the wide-angle end of a numerical example 2 equivalent to the example 2.

The zoom lens in FIG. 4 comprises a first lens unit L1b having positive refracting power, a second lens unit L2b having negative refracting power, an aperture stop SP, a third lens unit L3b having positive refracting power, a fourth lens unit L4b having negative refracting power, and a fifth lens unit L5b having positive refracting power in order from the object side to the image side. When zooming from the wide-angle end to the telephoto end, the first lens unit L1b is moved (A2) to the object side, the second lens unit L2b is moved (B2) to the image side, and the third lens unit L3b, fourth lens unit L4b, and fifth lens unit L5b are moved (D2, E2, and F2 respectively) to the object side while changing the space gap sandwiched with the respective lens units. Focusing is performed by moving the second lens unit L2b.

Of the first lens unit L1b, a refractive optical element GIT1b made up of a UV hardening resin is employed between a lens G11b on the most object side and a lens G12b on the image side thereof, and this UV hardening resin also serves as a function of an adhesive agent.

Also, of the fifth lens unit L5b, a refractive optical element GIT2b made up of a UV hardening resin is employed between a lens G53b on the most image side and a lens G52b on the object side thereof, and this UV hardening resin also serves as a function of an adhesive agent. The refractive optical elements GIT1b and GIT2b both provide the positive refracting power when assuming that both sides are the air.

The example 2 provides the desired dispersion properties by dispersing particulates (TiO2) within the UV hardening resin different from the numerical example 1 at a ratio by weight of about 3%.

FIG. 7 is a lens cross-sectional view at a zoom position at the wide-angle end of a numerical example 3 equivalent to the example 3. The zoom lens in FIG. 7 comprises a first lens unit L1c having positive refracting power, a second lens unit L2c having negative refracting power, a flaring-cut sub-stop SSP, an aperture stop SP, a third lens unit L3c having positive refracting power, a fourth lens unit L4c having negative refracting power, a fifth lens unit L5c having positive refracting power, and a sixth lens unit L6c having negative refracting power in order from the object side to the image side.

When zooming from the wide-angle end to the telephoto end, the first lens unit L1c is moved (A3) to the object side, the second lens unit L2c is moved (B3) to the image side, and the third lens unit L3c, fourth lens unit L4c, fifth lens unit L5c, and sixth lens unit L6c are each moved (D3, E3, and F3 respectively) to the object side while changing the space gap sandwiched with the respective lens units.

Of the first lens unit L1c, a refractive optical element GIT1 made up of a UV hardening resin is employed on the object side of the second lens G12c from the most object side.

The refractive optical element GIT1c provides positive refracting power when assuming that both sides are the air.

With the example 3, focusing from an infinite-distance object to a close object is performed by moving the sixth lens unit L6c to the image surface side.

The example 3 employs a nitrifying material satisfying the conditional expressions (9) and (10) (Product Name: FK01 manufactured by Shott Glass Technologies) as the material of the second lens G52c from the forward of the fifth lens unit L5c.

FIG. 10 is a lens cross-sectional view at a zoom position at the wide-angle end of a numerical example 4 equivalent to the example 4. The zoom lens in FIG. 10 comprises a first lens unit L1d having positive refracting power, a second lens unit L2d having negative refracting power, a flaring-cut sub-stop SSP, an aperture stop SP, a third lens unit L3d having positive refracting power, a fourth lens unit L4d having negative refracting power, a fifth lens unit L5d having positive refracting power, and a sixth lens unit L6d having negative refracting power in order from the object side to the image side.

When zooming from the wide-angle end to the telephoto end, the first lens unit L1d is moved (A4) to the object side, the second lens unit L2d is moved (B4) to the image side, and the third lens unit L3d, fourth lens unit L4d, fifth lens unit L5d, and sixth lens unit L6d are moved (D4, E4, F4, and G4 respectively) to the object side while changing the space gap sandwiched with the respective lens units.

Of the first lens unit L1d, a refractive optical element GIT1d made up of a UV hardening resin is employed between a lens G11d on the most object side and a lens G12d on the image side thereof, and this UV hardening resin also serves as a function of an adhesive agent.

Also, of the fifth lens unit L5d, a refractive optical element GIT2d made up of a UV hardening resin is employed on the image surface side of the lens G51d on the most object side, and the surface abutting on the air of the relevant refractive optical element GIT2d is an aspheric shape.

The refractive optical elements GIT1d and GIT2d both provide the positive refracting power when assuming that both sides are the air.

With the example 4, focusing from an infinite-distance object to a close object is performed by moving the sixth lens unit L6d to the image surface side.

FIGS. 13A and 13B are lens cross-sectional views at a zoom position at the wide-angle end of a numerical example 5 equivalent to the example 5.

The zoom lens in FIGS. 13A and 13B comprises a first lens unit L1e having positive refracting power, a second lens unit L2e having negative refracting power, an aperture stop SP, a third lens unit L3e having positive refracting power, a fourth lens unit L4e having positive refracting power, and a fifth lens unit L5e having negative refracting power in order from the object side to the image side. When zooming from the wide-angle end to the telephoto end, the first lens unit L1e is moved (A5) to the object side, the second lens unit L2e is moved (B5) to the image side, and the third lens unit L3e, fourth lens unit L4e, and fifth lens unit L5e are moved (D5, E5, and F5 respectively) to the object side while changing the space gap sandwiched with the respective lens units.

Of the first lens unit L1e, a refractive optical element GIT1 made up of a UV hardening resin is employed on the image side of the lens G13 on the most image side.

With the example 5, focusing from an infinite-distance object to a close object is performed by sending out the second lens unit L2e to the object side.

With the refractive optical element GIT1e, the positive refracting power is equivalent to the result of obtained by calculating both sides (light incident side) thereof as the air. The refractive optical element GIT1e has a function for reducing the secondary spectrum of a chromatic aberration of magnification at a zoom position on the telephoto side.

Further, employing the UV hardening resin as an extraordinary dispersion material enables the thickness to be thinned as compared to the conventional material such as fluorite, thereby facilitating downsizing of the entire lens system.

FIGS. 16A and 16B are lens cross-sectional views at a zoom position at the wide-angle end of a numerical example 6 equivalent to the example 6.

The zoom lens in FIGS. 16A and 16B comprises a first lens unit L1f having positive refracting power, a second lens unit L2f having negative refracting power, an aperture stop SP, a third lens unit L3f having positive refracting power, a fourth lens unit L4f having positive refracting power, and a fifth lens unit L5f having negative refracting power in order from the object side to the image side. When zooming from the wide-angle end to the telephoto end, the first lens unit L1f is moved (A6) to the object side, the second lens unit L2f is moved (B6) to the image side, and the third lens unit L3f, fourth lens unit L4f, and fifth lens unit L5f are moved (D6, E6, and F6 respectively) to the object side while changing the space gap sandwiched with the respective lens units.

of the first lens unit L2f, a refractive optical element GIT1f made up of a UV hardening resin is employed on the object side of the lens G21a on the most object side.

The refractive optical element GIT1f provides positive refracting power when assuming that both sides are the air.

FIGS. 19A and 19B are lens cross-sectional views at a zoom position at the wide-angle end of a numerical example 7 equivalent to the example 7. The zoom lens in FIGS. 19A and 19B comprises a first lens unit L1g having positive refracting power, a second lens unit L2g having positive refracting power, a third lens unit L3g having negative refracting power, a fourth lens unit L4g having positive refracting power, and a fifth lens unit L5g having positive refracting power which includes an aperture stop SP, in order from the object side to the image side.

When zooming from the wide-angle end to the telephoto end, the first lens unit L1g and fifth lens unit L5g are fixed, and the second lens unit L2g, third lens unit L3g, and fourth lens unit L4g are moved (B7, D7, and E1 respectively) to the image side while changing the space gap sandwiched with the respective lens units.

Of the first lens unit L1g, a refractive optical element GIT1g made up of a UV hardening resin is employed on the image side of the lens G13b on the most image side.

The refractive optical element GIT1g provides positive refracting power when assuming that both sides are the air.

FIGS. 22A and 22B are lens cross-sectional views at a zoom position at the wide-angle end of a numerical example 8 equivalent to the example 8. The zoom lens in FIGS. 22A and 22B comprises a first lens unit L1h having positive refracting power, a second lens unit L2h having positive refracting power, a third lens unit L3h having negative refracting power, a fourth lens unit L4h having positive refracting power, and a fifth lens unit L5h having positive refracting power which includes an aperture stop SP, in order from the object side to the image side.

When zooming from the wide-angle end to the telephoto end, the first lens unit L1h and fifth lens unit L5h are fixed, and the second lens unit L2h, third lens unit L3h, and fourth lens unit L4h are moved (B8, D8, and E8 respectively) to the image side while changing the space gap sandwiched with the respective lens units.

Of the fifth lens unit L5h, a refractive optical element GIT2h made up of a UV hardening resin is employed on the image side of the lens G56a on the most image side.

The refractive optical element GIT2h provides negative refracting power when assuming that both sides are the air.

As described above, the zoom lens of each example employs an optical member different from existing optical glass and fluorite, and this optical material is disposed at an appropriate position within the zoom lens with appropriate refracting power, whereby effective correction of a chromatic aberration can be performed to obtain a high quality image.

The specific numerical data of the numerical examples 1 and 2 is shown below. With each numerical example, i denotes the order counted from the object side, ri denotes the curvature radius of the i-th optical surface (the i-th surface), di denotes the marginal gap between the i-th surface and the (i+1) surface, ni and vi are the refractive index, and the Abbe number of the material of the i-th optical member as to the d-line respectively.

Here, f is a focal length, Fno is an F number, and ω is a half-angle of view.

Also, when assuming that X is the amount of displacement from the surface peak in the optical-axis direction, h is the height from the optical axis in the direction perpendicular to the optical axis, r is a paraxial curvature radius, k is a cone constant, and B, C, D, E, are the aspheric coefficient of the respective orders, the aspheric shape can be represented with the following expression.

$$x(h) = \frac{(1/r)h^2}{1+\sqrt{\{1-(1+k)(h/r)^2\}}} + Bh^4 + Ch^6 + Dh^8 + Eh^{10} \ldots$$

Note that "E±XX" in each aspheric coefficient refers to "×10$^{\pm xx}$".

The relationships between the above respective conditional expressions and the respective examples are shown in Table 1.

NUMERICAL EXAMPLE 1

| f = 17.6 through 82.5, Fno = 1:4.1 through 5.8, 2ω = 75.8° through 18.8° | | | |
|---|---|---|---|
| r1 = 92.639 | d1 = 1.40 | n1 = 1.84666 | v1 = 23.9 |
| r2 = 37.112 | d2 = 1.64 | n2 = 1.63555 | v2 = 22.7 (GIT1) |
| r3 = 45.264 | d3 = 6.36 | n3 = 1.62299 | v3 = 58.2 |
| r4 = 343.386 | d4 = 0.12 | | |
| r5 = 39.598 | d5 = 5.72 | n4 = 1.71300 | v4 = 53.9 |
| r6 = 158.970 | d6 = variable | | |
| r7 = 97.473 | d7 = 1.20 | n5 = 1.77250 | v5 = 49.6 |
| r8 = 10.269 | d8 = 5.12 | | |

-continued

| | | | |
|---|---|---|---|
| r9 = −77.373 | d9 = 1.00 | n6 = 1.88300 | v6 = 40.8 |
| r10 = 29.599 | d10 = 0.15 | | |
| r11 = 16.673 | d11 = 3.90 | n7 = 1.80518 | v7 = 25.4 |
| r12 = −42.773 | d12 = 0.35 | | |
| r13 = −29.375 | d13 = 1.00 | n8 = 1.67003 | v8 = 47.2 |
| r14 = 36.835 | d14 = variable | | |
| r15 = (stop) | d15 = variable | | |
| r16 = 53.824 | d16 = 0.80 | n9 = 1.71300 | v9 = 53.9 |
| r17 = 14.156 | d17 = 3.31 | n10 = 1.48749 | v10 = 70.2 |
| r18 = −40.833 | d18 = 0.15 | | |
| r19 = 23.252 | d19 = 3.98 | n11 = 1.48749 | v11 = 70.2 |
| r20 = −11.906 | d20 = 0.90 | n12 = 1.69895 | v12 = 30.1 |
| r21 = −18.332 | d21 = variable | | |
| r22 = −58.279 | d22 = 2.12 | n13 = 1.80518 | v13 = 25.4 |
| r23 = −16.947 | d23 = 0.80 | n14 = 1.74400 | v14 = 44.8 |
| r24 = 89.135 | d24 = 4.85 | | |
| r25 = −19.882 | d25 = 1.20 | n15 = 1.60311 | v15 = 60.6 |
| r26 = −52.937 | d26 = variable | | |
| r27 = 72.702 | d27 = 6.67 | n16 = 1.58313 | v16 = 59.4 |
| r28 = −21.391 (aspheric surface) | d28 = 0.22 | | |
| r29 = −189.196 | d29 = 4.69 | n17 = 1.48749 | v17 = 70.2 |
| r30 = −19.544 | d30 = 2.09 | n18 = 1.63555 | v18 = 22.7 (GIT2) |
| r31 = −13.990 | d31 = 1.30 | n19 = 1.84666 | v19 = 23.9 |
| r32 = −38.794 | | | |

| | FOCAL LENGTH | | |
|---|---|---|---|
| VARIABLE INTERVAL | 17.56 | 24.60 | 82.50 |
| d6 | 1.89 | 7.79 | 29.18 |
| d14 | 14.12 | 10.94 | 1.50 |
| d15 | 3.33 | 2.30 | 2.83 |
| d21 | 1.32 | 3.45 | 9.24 |
| d26 | 9.28 | 7.15 | 1.36 |
| kinf | 39.02 | 42.24 | 51.35 |

ASPHERIC COEFFICIENT
THE 28TH SURFACE

| K | B | C | D | E |
|---|---|---|---|---|
| −2.549530e−01 | 4.800620e−06 | −5.098044e−09 | −1.819112e−11 | −4.812577e−13 |

NUMERICAL EXAMPLE 2

| f = 17.6 through 82.5, Fno = 1:4.1 through 5.8, 2ω = 75.8° through 18.8° | | | |
|---|---|---|---|
| r1 = 92.052 | d1 = 1.40 | n1 = 1.84666 | v1 = 23.9 |
| r2 = 41.809 | d2 = 1.82 | n2 = 1.55324 | v2 = 39.8 (GIT1) |
| r3 = 54.035 | d3 = 5.82 | n3 = 1.62299 | v3 = 58.2 |
| r4 = 475.253 | d4 = 0.12 | | |
| r5 = 38.654 | d5 = 5.71 | n4 = 1.71300 | v4 = 53.9 |
| r6 = 121.921 | d6 = variable | | |
| r7 = 94.474 | d7 = 1.20 | n5 = 1.77250 | v5 = 49.6 |
| r8 = 9.872 | d8 = 5.20 | | |
| r9 = −133.983 | d9 = 1.00 | n6 = 1.88300 | v6 = 40.8 |
| r10 = 24.224 | d10 = 0.15 | | |
| r11 = 15.495 | d11 = 3.86 | n7 = 1.80518 | v7 = 25.4 |
| r12 = −66.847 | d12 = 0.23 | | |
| r13 = −46.913 | d13 = 1.00 | n8 = 1.67003 | v8 = 47.2 |
| r14 = 34.072 | d14 = variable | | |
| r15 = (stop) | d15 = variable | | |
| r16 = 73.554 | d16 = 0.80 | n9 = 1.71300 | v9 = 53.9 |
| r17 = 12.985 | d17 = 3.48 | n10 = 1.48749 | v10 = 70.2 |
| r18 = −39.745 | d18 = 0.15 | | |
| r19 = 21.854 | d19 = 4.81 | n11 = 1.48749 | v11 = 70.2 |
| r20 = −12.728 | d20 = 0.90 | n12 = 1.69895 | v12 = 30.1 |
| r21 = −18.228 | d21 = variable | | |
| r22 = −66.696 | d22 = 3.59 | n13 = 1.80518 | v13 = 25.4 |
| r23 = −17.045 | d23 = 0.80 | n14 = 1.74400 | v14 = 44.8 |
| r24 = 74.452 | d24 = 1.4 | | |

-continued

| | | | |
|---|---|---|---|
| r25 = −18.452 | d25 = 1.20 | n15 = 1.60311 | ν15 = 60.6 |
| r26 = −36.139 | d26 = variable | | |
| r27 = 93.460 | d27 = 5.63 | n16 = 1.58313 | ν16 = 59.4 |
| r28 = −21.965 | d28 = 0.22 | | |
| (aspheric surface) | | | |
| r29 = −113.180 | d29 = 6.54 | n17 = 1.48749 | ν17 = 70.2 |
| r30 = −24.445 | d30 = 2.00 | n18 = 1.55324 | ν18 = 39.8 (GIT2) |
| r31 = −14.863 | d31 = 1.30 | n19 = 1.84666 | ν19 = 23.9 |
| r32 = −36.128 | | | |

| | FOCAL LENGTH | | |
|---|---|---|---|
| VARIABLE INTERVAL | 17.56 | 24.05 | 82.49 |
| d6 | 1.89 | 7.65 | 29.68 |
| d14 | 14.88 | 11.79 | 1.50 |
| d15 | 2.78 | 1.82 | 2.67 |
| d21 | 1.60 | 3.39 | 9.15 |
| d26 | 9.28 | 7.49 | 1.73 |
| kinf | 39.00 | 42.20 | 51.20 |

ASPHERIC COEFFICIENT
THE 28TH SURFACE

| K | B | C | D | E |
|---|---|---|---|---|
| −2.549530e−01 | 4.989677e−06 | 3.273619e−09 | 1.796941e−11 | −4.812577e−13 |

NUMERICAL EXAMPLE 3 f = 29.1 through 293.4, Fno = 1:3.5 through 5.9, 2ω = 73.2° through 8.4°

| | | | |
|---|---|---|---|
| r1 = 170.843 | d1 = 2.00 | n1 = 1.84666 | ν1 = 23.9 |
| r2 = 62.946 | d2 = 0.50 | | |
| r3 = 63.440 | d3 = 2.00 | n2 = 1.63555 | ν2 = 22.7 (GIT1) |
| r4 = 78.793 | d4 = 8.53 | n3 = 1.59240 | ν3 = 68.3 |
| r5 = −712.479 | d5 = 0.12 | | |
| r6 = 64.301 | d6 = 6.85 | n4 = 1.72916 | ν4 = 54.7 |
| r7 = 275.446 | d7 = variable | | |
| r8 = 106.545 | d8 = 1.20 | n5 = 1.80400 | ν5 = 46.6 |
| r9 = 19.084 | d9 = 7.24 | | |
| r10 = −38.824 | d10 = 1.10 | n6 = 1.77250 | ν6 = 49.6 |
| r11 = 68.451 | d11 = 0.10 | | |
| r12 = 37.948 | d12 = 5.12 | n7 = 1.81786 | ν7 = 23.7 |
| r13 = −32.431 | d13 = 0.70 | | |
| r14 = −27.425 | d14 = 1.10 | n8 = 1.83481 | ν8 = 42.7 |
| r15 = 176.232 | d15 = variable | | |
| r16 = flaring cut stop | d16 = variable | | |
| r17 = stop | d17 = 0.00 | | |
| r18 = 42.780 | d18 = 4.13 | n9 = 1.60311 | ν9 = 60.7 |
| r19 = −46.998 | d19 = 0.12 | | |
| (aspheric surface) | | | |
| r20 = 41.428 | d20 = 5.33 | n10 = 1.60311 | ν10 = 60.7 |
| r21 = −23.170 | d21 = 1.15 | n11 = 1.85026 | ν11 = 32.3 |
| r22 = −1496.377 | d22 = variable | | |
| r23 = −48.088 | d23 = 3.31 | n12 = 1.74077 | ν12 = 27.8 |
| r24 = −18.007 | d24 = 1.10 | n13 = 1.83481 | ν13 = 42.7 |
| r25 = 1026.698 | d25 = variable | | |
| r26 = 68.061 | d26 = 3.50 | n14 = 1.58313 | ν14 = 59.4 |
| r27 = −63.107 | d27 = 0.15 | | |
| (aspheric surface) | | | |
| r28 = 174.149 | d28 = 5.19 | n15 = 1.49700 | ν15 = 81.5 (FK01) |
| r29 = −28.361 | d29 = 0.15 | | |
| r30 = 76.610 | d30 = 5.84 | n16 = 1.51633 | ν16 = 64.2 |
| r31 = −27.683 | d31 = 1.20 | n17 = 1.85026 | ν17 = 32.3 |
| r32 = −5045.158 | d32 = variable | | |
| r33 = −469.768 | d33 = 1.70 | n18 = 1.77250 | ν18 = 49.6 |
| r34 = 25.150 | d34 = 1.40 | | |

-continued

| | | | |
|---|---|---|---|
| r35 = 26.473 | d35 = 3.45 | n19 = 1.84666 | ν19 = 23.9 |
| r36 = 40.159 | | | |

| | FOCAL LENGTH | | |
|---|---|---|---|
| VARIABLE INTERVAL | 29.14 | 72.87 | 293.44 |
| d7 | 1.60 | 27.60 | 53.61 |
| d15 | 10.98 | 5.57 | 0.16 |
| d16 | 14.93 | 10.25 | 1.16 |
| d22 | 1.76 | 5.53 | 9.30 |
| d25 | 14.41 | 7.81 | 1.19 |
| d32 | 2.92 | 3.29 | 1.64 |
| kinf | 39.41 | 53.44 | 73.96 |

ASPHERIC COEFFICIENT

| | b | c | d |
|---|---|---|---|
| THE 19TH SURFACE | −3.362937e−06 | −7.581088e−09 | −3.242562e−12 |
| THE 27TH SURFACE | 1.202962e−05 | 8.668672e−09 | −5.542556e−12 |

NUMERICAL EXAMPLE 4 f = 29.2 through 293.4, Fno = 1:3.6 through 5.9, 2ω = 73.1° through 8.4°

| | | | |
|---|---|---|---|
| r1 = 228.930 | d1 = 2.00 | n1 = 1.84666 | ν1 = 23.9 |
| r2 = 68.499 | d2 = 2.00 | n2 = 1.63555 | ν2 = 22.7 (GIT1) |
| r3 = 88.985 | d3 = 9.03 | n3 = 1.59240 | ν3 = 68.3 |
| r4 = −286.668 | d4 = 0.12 | | |
| r5 = 60.090 | d5 = 6.45 | n4 = 1.72916 | ν4 = 54.7 |
| r6 = 188.014 | d6 = variable | | |
| r7 = 99.585 | d7 = 1.20 | n5 = 1.80400 | ν5 = 46.6 |
| r8 = 18.125 | d8 = 7.70 | | |
| r9 = −38.472 | d9 = 1.10 | n6 = 1.77250 | ν6 = 49.6 |
| r10 = 78.250 | d10 = 0.10 | | |
| r11 = 36.780 | d11 = 5.15 | n7 = 1.81786 | ν7 = 23.7 |
| r12 = −33.002 | d12 = 0.80 | | |
| r13 = −26.757 | d13 = 1.10 | n8 = 1.83481 | ν8 = 42.7 |

-continued

| | | | |
|---|---|---|---|
| r14 = 222.267 | d14 = variable | | |
| r15 = flaring cut stop | d15 = variable | | |
| r16 = stop | d16 = 0.00 | | |
| r17 = 38.550 | d17 = 4.55 | n9 = 1.60311 | ν9 = 60.7 |
| r18 = −43.016 (aspheric surface) | d18 = 0.12 | | |
| r19 = 48.458 | d19 = 5.06 | n10 = 1.60562 | ν10 = 43.7 |
| r20 = −24.912 | d20 = 1.15 | n11 = 1.84666 | ν11 = 23.9 |
| r21 = −1576.917 | d21 = variable | | |
| r22 = −39.551 | d22 = 3.38 | n12 = 1.74077 | ν12 = 27.8 |
| r23 = −16.538 | d23 = 1.10 | n13 = 1.83481 | ν13 = 42.7 |
| r24 = 7151.014 | d24 = variable | | |
| r25 = 71.142 | d25 = 3.04 | n14 = 1.58313 | ν14 = 59.4 |
| r26 = −79.700 | d26 = 1.00 | n15 = 1.63555 | ν15 = 22.7 (GIT2) |
| r27 = −46.202 (aspheric surface) | d27 = 0.15 | | |
| r28 = 184.841 | d28 = 4.36 | n16 = 1.51112 | ν16 = 60.5 |
| r29 = −31.511 | d29 = 0.15 | | |
| r30 = 65.558 | d30 = 6.24 | n17 = 1.51633 | ν17 = 64.2 |
| r31 = −20.965 | d31 = 1.20 | n18 = 1.85026 | ν18 = 32.3 |
| r32 = 302.809 | d32 = variable | | |
| r33 = 297.227 | d33 = 1.70 | n19 = 1.77250 | ν19 = 49.6 |
| r34 = 28.295 | d34 = 2.33 | | |
| r35 = 27.580 | d35 = 2.87 | n20 = 1.84666 | ν20 = 23.9 |
| r36 = 34.747 | | | |

FOCAL LENGTH

| VARIABLE INTERVAL | 29.18 | 72.78 | 293.44 |
|---|---|---|---|
| d6 | 1.38 | 27.53 | 53.68 |
| d14 | 10.77 | 5.47 | 0.16 |
| d15 | 15.69 | 10.94 | 1.17 |
| d21 | 1.91 | 6.19 | 10.47 |
| d24 | 12.36 | 6.52 | 1.25 |
| d32 | 2.79 | 3.15 | 1.49 |
| kinf | 39.19 | 51.78 | 70.86 |

ASPHERIC COEFFICIENT

| | b | c | d |
|---|---|---|---|
| THE 18TH SURFACE | −7.364433e−07 | 7.350496e−10 | −9.756984e−12 |
| THE 27TH SURFACE | 5.965419e−06 | 5.506383e−10 | −7.915109e−12 |

Refractive index of each lens of Example 1

| | d | g | C | F |
|---|---|---|---|---|
| G1 | 1.846660 | 1.893856 | 1.836554 | 1.871929 |
| GIT1 | 1.635550 | 1.675340 | 1.675340 | 1.675340 |
| G2 | 1.622992 | 1.636296 | 1.619739 | 1.630450 |
| G3 | 1.712995 | 1.729435 | 1.708974 | 1.722210 |
| G4 | 1.772499 | 1.791972 | 1.767798 | 1.783374 |
| G5 | 1.882997 | 1.910497 | 1.876560 | 1.898221 |
| G6 | 1.805181 | 1.847285 | 1.796106 | 1.827775 |
| G7 | 1.670029 | 1.687957 | 1.665788 | 1.679974 |
| G8 | 1.712995 | 1.729435 | 1.708974 | 1.722210 |
| G9 | 1.487490 | 1.495964 | 1.485344 | 1.492285 |
| G10 | 1.487490 | 1.495964 | 1.485344 | 1.492285 |
| G11 | 1.698947 | 1.729412 | 1.692225 | 1.715424 |
| G12 | 1.805181 | 1.847285 | 1.796106 | 1.827775 |
| G13 | 1.743997 | 1.765055 | 1.739048 | 1.755661 |
| G14 | 1.603112 | 1.615409 | 1.600078 | 1.610024 |
| G15 | 1.583126 | 1.595279 | 1.580134 | 1.589954 |
| G16 | 1.487490 | 1.495964 | 1.485344 | 1.492285 |
| GIT2 | 1.635550 | 1.675340 | 1.675340 | 1.675340 |
| G17 | 1.846660 | 1.893856 | 1.836554 | 1.871929 |

Refractive index of each lens of Example 2

| | d | g | C | F |
|---|---|---|---|---|
| G1 | 1.846660 | 1.893856 | 1.836554 | 1.871929 |
| GIT1 | 1.553240 | 1.572500 | 1.572500 | 1.572500 |
| G2 | 1.622992 | 1.636296 | 1.619739 | 1.630450 |
| G3 | 1.712995 | 1.729435 | 1.708974 | 1.722210 |
| G4 | 1.772499 | 1.791972 | 1.767798 | 1.783374 |
| G5 | 1.882997 | 1.910497 | 1.876560 | 1.898221 |
| G6 | 1.805181 | 1.847285 | 1.796106 | 1.827775 |
| G7 | 1.670029 | 1.687957 | 1.665788 | 1.679974 |
| G8 | 1.712995 | 1.729435 | 1.708974 | 1.722210 |
| G9 | 1.487490 | 1.495964 | 1.485344 | 1.492285 |
| G10 | 1.487490 | 1.495964 | 1.485344 | 1.492285 |
| G11 | 1.698947 | 1.729412 | 1.692225 | 1.715424 |
| G12 | 1.805181 | 1.847285 | 1.796106 | 1.827775 |
| G13 | 1.743997 | 1.765055 | 1.739048 | 1.755661 |
| G14 | 1.603112 | 1.615409 | 1.600078 | 1.610024 |
| G15 | 1.583126 | 1.595279 | 1.580134 | 1.589954 |
| G16 | 1.487490 | 1.495964 | 1.485344 | 1.492285 |
| GIT2 | 1.553240 | 1.572500 | 1.572500 | 1.572500 |
| G17 | 1.846660 | 1.893856 | 1.836554 | 1.871929 |

Refractive index of each lens of Example 3

| | d | g | C | F |
|---|---|---|---|---|
| G1 | 1.846658 | 1.893817 | 1.836529 | 1.871976 |
| GIT1 | 1.635550 | 1.675340 | 1.675340 | 1.675340 |
| G2 | 1.592400 | 1.603180 | 1.589780 | 1.598450 |
| G3 | 1.729157 | 1.745703 | 1.725104 | 1.738438 |
| G4 | 1.804000 | 1.825695 | 1.798817 | 1.816079 |
| G5 | 1.772499 | 1.791962 | 1.767798 | 1.783373 |
| G6 | 1.817860 | 1.863980 | 1.808000 | 1.842550 |
| G7 | 1.834807 | 1.859530 | 1.828977 | 1.848517 |
| G8 | 1.603112 | 1.615392 | 1.600082 | 1.610018 |
| G9 | 1.603112 | 1.615392 | 1.600082 | 1.610018 |
| G10 | 1.850259 | 1.884505 | 1.842582 | 1.868918 |
| G11 | 1.740769 | 1.775895 | 1.733084 | 1.759737 |
| G12 | 1.834807 | 1.859530 | 1.828977 | 1.848517 |
| G13 | 1.583126 | 1.595297 | 1.580141 | 1.589962 |
| G14 | 1.496999 | 1.504509 | 1.495138 | 1.501233 |
| G15 | 1.516330 | 1.526211 | 1.513855 | 1.521904 |
| G16 | 1.850259 | 1.884505 | 1.842582 | 1.868918 |
| G17 | 1.772499 | 1.791962 | 1.767798 | 1.783373 |
| G18 | 1.846658 | 1.893817 | 1.836529 | 1.871976 |

Refractive index of each lens of Example 4

| | d | g | C | F |
|---|---|---|---|---|
| G1 | 1.846658 | 1.893817 | 1.836529 | 1.871976 |
| GIT1 | 1.635550 | 1.675340 | 1.675340 | 1.675340 |
| G2 | 1.592400 | 1.603180 | 1.589780 | 1.598450 |
| G3 | 1.729157 | 1.745703 | 1.725104 | 1.738438 |
| G4 | 1.804000 | 1.825695 | 1.798817 | 1.816079 |
| G5 | 1.772499 | 1.791962 | 1.767798 | 1.783373 |
| G6 | 1.817860 | 1.863980 | 1.808000 | 1.842550 |
| G7 | 1.834807 | 1.859530 | 1.828977 | 1.848517 |
| G8 | 1.603112 | 1.615392 | 1.600082 | 1.610018 |
| G9 | 1.605620 | 1.623274 | 1.601512 | 1.615364 |
| G10 | 1.846658 | 1.893817 | 1.836529 | 1.871976 |
| G11 | 1.740769 | 1.775895 | 1.733084 | 1.759737 |
| G12 | 1.834807 | 1.859530 | 1.828977 | 1.848517 |
| G13 | 1.583126 | 1.595297 | 1.580141 | 1.589962 |
| GIT2 | 1.635550 | 1.675340 | 1.675340 | 1.675340 |
| G14 | 1.511121 | 1.521591 | 1.508548 | 1.516998 |
| G15 | 1.516330 | 1.526211 | 1.513855 | 1.521904 |
| G16 | 1.850259 | 1.884505 | 1.842582 | 1.868918 |

-continued

|  | d | g | C | F |
|---|---|---|---|---|
| G17 | 1.772499 | 1.791962 | 1.767798 | 1.783373 |
| G18 | 1.846658 | 1.893817 | 1.836529 | 1.871976 |

NUMERICAL EXAMPLE 5 f = 76.61 through 290.12, Fno = 1:4.27 through 5.85, 2ω = 31.5° through 8.5°

| r1 = 119.523 | d1 = 0.50 | n1 = 1.784723 | ν1 = 25.7 |
|---|---|---|---|
| r2 = 62.741 | d2 = 6.16 | n2 = 1.516330 | ν2 = 64.2 |
| r3 = 1157.754 | d3 = 0.20 | | |
| r4 = 78.102 | d4 = 4.50 | n3 = 1.516330 | ν3 = 64.2 |
| r5 = 321.409 | d5 = 2.19 | n4 = 1.63555 | ν4 = 22.7 (GIT1) |
| *r6 = 1098.172 | d6 = variable | | |
| r7 = −174.220 | d7 = 3.64 | n5 = 1.834807 | ν5 = 42.7 |
| r8 = 27.885 | d8 = 6.49 | | |
| r9 = 40.553 | d9 = 4.38 | n6 = 1.846659 | ν6 = 23.8 |
| r10 = 192.559 | d10 = variable | | |
| r11 = stop | d11 = 10.19 | | |
| r12 = −257.189 | d12 = 2.20 | n7 = 1.805181 | ν7 = 25.4 |
| r13 = 102.408 | d13 = 4.11 | n8 = 1.517417 | ν8 = 52.4 |
| r14 = −35.099 | d14 = variable | | |
| r15 = 89.060 | d15 = 4.32 | n9 = 1.487490 | ν9 = 70.2 |
| r16 = −28.697 | d16 = 1.62 | n10 = 1.834000 | ν10 = 37.2 |
| r17 = −121.290 | d17 = 0.47 | | |
| r18 = 56.215 | d18 = 3.99 | n11 = 1.571351 | ν11 = 53.0 |
| r19 = −79.475 | d19 = variable | | |
| r20 = 1487.422 | d20 = 2.37 | n12 = 1.743198 | ν12 = 49.3 |
| r21 = 34.244 | d21 = 2.41 | | |
| r22 = −103.195 | d22 = 1.39 | n13 = 1.712995 | ν13 = 53.8 |
| r23 = 38.205 | d23 = 2.20 | n14 = 1.728249 | ν14 = 28.5 |
| r24 = −1721.772 | | | |

| | FOCAL LENGTH | | |
|---|---|---|---|
| VARIABLE INTERVAL | 76.61 | 149.09 | 290.12 |
| d6 | 7.64 | 36.60 | 62.65 |
| d10 | 33.01 | 18.22 | −0.16 |
| d14 | 0.76 | 15.55 | 33.93 |
| d19 | 21.16 | 15.53 | −0.54 |

ASPHERIC COEFFICIENT

THE 6TH SURFACE:   K = 0, B = −4.84997e−09, C = −3.68157e−12

NUMERICAL EXAMPLE 6 f = 77.53 through 290.11, Fno = 1:4.40 through 6.29, 2ω = 31.2° through 8.5°

| r1 = 92.255 | d1 = 0.80 | n1 = 1.805181 | ν1 = 25.4 |
|---|---|---|---|
| r2 = 60.449 | d2 = 6.54 | n2 = 1.516330 | ν2 = 64.2 |
| r3 = 823.809 | d3 = 0.20 | | |
| r4 = 90.202 | d4 = 4.50 | n3 = 1.516330 | ν3 = 64.2 |
| r5 = 836.515 | d5 = variable | | |
| *r6 = −155.829 | d6 = 1.60 | n4 = 1.63555 | ν4 = 22.7 (GIT1) |
| r7 = −65.459 | d7 = 3.00 | n5 = 1.834807 | ν5 = 42.7 |
| r8 = 30.405 | d8 = 6.39 | | |
| r9 = 43.038 | d9 = 3.26 | n6 = 1.846659 | ν6 = 23.8 |
| r10 = 196.468 | d10 = variable | | |
| r11 = stop | d11 = 10.19 | | |
| r12 = −917.821 | d12 = 2.20 | n7 = 1.805181 | ν7 = 25.4 |
| r13 = 69.031 | d13 = 4.53 | n8 = 1.517417 | ν8 = 52.4 |
| r14 = −34.259 | d14 = variable | | |
| r15 = 102.408 | d15 = 4.11 | n9 = 1.487490 | ν9 = 70.2 |
| r16 = −29.639 | d16 = 2.50 | n10 = 1.834000 | ν10 = 37.2 |
| r17 = −118.233 | d17 = 9.42 | | |
| r18 = 58.509 | d18 = 3.56 | n11 = 1.571351 | ν11 = 53.0 |
| r19 = −82.582 | d19 = variable | | |
| r20 = 58080.73 | d20 = 1.34 | n12 = 1.772499 | ν12 = 49.6 |
| r21 = 34.674 | d21 = 2.41 | | |
| r22 = −99.654 | d22 = 1.40 | n13 = 1.712995 | ν13 = 53.8 |
| r23 = 35.999 | d23 = 2.20 | n14 = 1.728249 | ν14 = 28.5 |
| r24 = −1453.857 | | | |

| | FOCAL LENGTH | | |
|---|---|---|---|
| VARIABLE INTERVAL | 77.53 | 149.98 | 290.11 |
| d5 | 3.00 | 31.95 | 58.00 |
| d10 | 29.41 | 17.34 | 1.40 |
| d14 | 0.76 | 12.83 | 28.77 |
| d19 | 22.67 | 17.27 | 1.65 |

ASPHERIC COEFFICIENT

THE 6TH SURFACE:   K = 0, B = −3.23430e−07, C = −8.56937e−10

NUMERICAL EXAMPLE 7 f = 72.10 through 194.02, Fno = 1:2.93 through 3.02, 2ω = 33.4° through 12.7°

| r1 = ∞ | d1 = 1.50 | | |
|---|---|---|---|
| r2 = 579.705 | d2 = 1.94 | n1 = 1.761821 | ν1 = 26.5 |
| r3 = 99.477 | d3 = 0.44 | | |
| r4 = 93.304 | d4 = 8.69 | n2 = 1.516330 | ν2 = 64.2 |
| r5 = 24982.29 | d5 = 0.10 | | |
| r6 = 119.694 | d6 = 5.71 | n3 = 1.639999 | ν3 = 60.1 |
| r7 = 542.260 | d7 = 2.00 | n4 = 1.63555 | ν4 = 22.7 (GIT1) |
| *r8 = −1028.34 | d8 = variable | | |
| r9 = 51.345 | d9 = 2.33 | n5 = 1.846659 | ν5 = 23.8 |
| r10 = 44.616 | d10 = 3.10 | | |
| r11 = 51.827 | d11 = 8.21 | n6 = 1.487490 | ν6 = 70.2 |
| r12 = −1700.60 | d12 = 0.00 | | |
| r13 = ∞ | d13 = variable | | |
| r14 = −332.353 | d14 = 1.99 | n7 = 1.804000 | ν7 = 46.6 |
| r15 = 39.328 | d15 = 5.66 | | |
| r16 = −77.664 | d16 = 2.62 | n8 = 1.487490 | ν8 = 70.2 |
| r17 = 39.725 | d17 = 4.65 | n9 = 1.846658 | ν9 = 23.9 |
| r18 = 483.436 | d18 = 2.39 | | |
| r19 = −91.097 | d19 = 2.67 | n10 = 1.729157 | ν10 = 54.7 |
| r20 = 240.723 | d20 = variable | | |
| r21 = 142.766 | d21 = 6.08 | n11 = 1.696797 | ν11 = 55.5 |
| r22 = −66.846 | d22 = 0.41 | | |
| r23 = 276.313 | d23 = 4.77 | n12 = 1.487490 | ν12 = 70.2 |
| r24 = −44.296 | d24 = 1.45 | n13 = 1.834000 | ν13 = 37.2 |
| r25 = 8010.231 | d25 = variable | | |
| r26 = 67.139 | d26 = 3.13 | n14 = 1.804000 | ν14 = 46.6 |
| r27 = 187.825 | d27 = 3.00 | | |
| r28 = stop | d28 = 3.21 | | |
| r29 = 36.265 | d29 = 6.90 | n15 = 1.487490 | ν15 = 70.2 |
| r30 = 2406.674 | d30 = 2.18 | n16 = 1.620041 | ν16 = 36.3 |
| r31 = 40.170 | d31 = 5.50 | | |
| r32 = ∞ | d32 = 22.81 | | |
| r33 = 199.856 | d33 = 7.73 | n17 = 1.517417 | ν17 = 52.4 |
| r34 = −69.541 | d34 = 13.28 | | |
| r35 = −31.538 | d35 = 2.08 | n18 = 1.834000 | ν18 = 37.2 |
| r36 = −57.583 | d36 = 0.15 | | |

| r37 = 65.936 | d37 = 6.33 | n19 = 1.743198 | ν19 = 49.3 |
| --- | --- | --- | --- |
| r38 = 119.280 | | | |

| | FOCAL LENGTH | | |
| --- | --- | --- | --- |
| VARIABLE INTERVAL | 72.10 | 118.27 | 194.02 |
| d8 | 7.12 | 17.23 | 31.21 |
| d13 | 3.06 | 9.13 | 18.69 |
| d20 | 33.84 | 27.06 | 0.49 |
| d25 | 6.98 | −2.42 | 0.61 |

ASPHERIC COEFFICIENT

THE 8TH SURFACE:    K = 0, B = 4.00714e−08, C = 5.04559e−12

NUMERICAL EXAMPLE 8 f = 72.09 through 194.01, Fno = 1:2.95 through 2.96, 2ω = 33.4° through 12.7°

| r1 = ∞ | d1 = 1.50 | | |
| --- | --- | --- | --- |
| r2 = 249.563 | d2 = 1.69 | n1 = 1.805181 | ν1 = 25.4 |
| r3 = 132.976 | d3 = 1.01 | | |
| r4 = 148.933 | d4 = 8.69 | n2 = 1.487490 | ν2 = 70.2 |
| r5 = −295.554 | d5 = 0.10 | | |
| r6 = 82.715 | d6 = 5.71 | n3 = 1.487490 | ν3 = 70.2 |
| r7 = 194.445 | d8 = variable | | |
| r8 = 57.470 | d9 = 1.92 | n4 = 1.846659 | ν4 = 23.8 |
| r9 = 48.542 | d10 = 0.84 | | |
| r10 = 51.827 | d11 = 8.03 | n5 = 1.487490 | ν5 = 70.2 |
| r11 = 1277.751 | d12 = 0.00 | | |
| r12 = ∞ | d13 = variable | | |
| r13 = −488.702 | d14 = 1.28 | n6 = 1.804000 | ν6 = 46.6 |
| r14 = 34.917 | d15 = 6.02 | | |
| r15 = −86.952 | d16 = 1.31 | n7 = 1.487490 | ν7 = 70.2 |
| r16 = 37.232 | d17 = 4.07 | n8 = 1.846658 | ν8 = 23.9 |
| r17 = 346.673 | d18 = 2.76 | | |
| r18 = −65.344 | d19 = 4.63 | n9 = 1.729157 | ν9 = 54.7 |
| r19 = −2002.69 | d20 = variable | | |
| r20 = 173.365 | d21 = 6.90 | n10 = 1.696797 | ν10 = 55.5 |
| r21 = −60.742 | d22 = 0.15 | | |
| r22 = −307.995 | d23 = 4.59 | n11 = 1.487490 | ν11 = 70.2 |
| r23 = −40.369 | d24 = 1.45 | n12 = 1.834000 | ν12 = 37.2 |
| r24 = −180.725 | d25 = variable | | |
| r25 = 64.378 | d26 = 3.18 | n13 = 1.804000 | ν13 = 46.6 |
| r26 = 243.834 | d27 = 3.00 | | |
| r27 = stop | d28 = 0.50 | | |
| r28 = 37.204 | d29 = 6.38 | n14 = 1.516330 | ν14 = 64.2 |
| r29 = −344.455 | d30 = 1.00 | n15 = 1.620041 | ν15 = 36.3 |
| r30 = 34.342 | d31 = 5.50 | | |
| r31 = ∞ | d32 = 38.09 | | |
| r32 = 126.740 | d33 = 5.12 | n16 = 1.517417 | ν16 = 52.4 |
| r33 = −74.764 | d34 = 12.73 | | |
| r34 = −42.800 | d35 = 1.23 | n17 = 1.834000 | ν17 = 37.2 |
| r35 = −107.397 | d36 = 0.15 | | |
| r36 = 123.796 | d37 = 3.87 | n18 = 1.743412 | ν18 = 49.3 |
| r37 = 4109.991 | d38 = 0.90 | n19 = 1.63555 | ν19 = 22.7 (GIT2) |
| *r38 = 3846.831 | | | |

| | FOCAL LENGTH | | |
| --- | --- | --- | --- |
| VARIABLE INTERVAL | 72.09 | 118.27 | 194.01 |
| d7 | 6.01 | 16.11 | 30.10 |
| d12 | 4.44 | 10.89 | 20.33 |
| d19 | 30.02 | 23.72 | 0.51 |
| d24 | 11.24 | 0.97 | 0.76 |

ASPHERIC COEFFICIENT

THE 38TH SURFACE:    K = 0, B = 1.25987e−07, C = −1.29985e−10

TABLE 1

| | NUMERICAL EXAMPLE | | | | | | | |
| --- | --- | --- | --- | --- | --- | --- | --- | --- |
| CONDITIONAL EXPRESSION | 1<br>5 UNITS<br>(PNPNP) | 2<br>5 UNITS<br>(PNPNP) | 3<br>6 UNITS<br>PNPNPN | 4<br>6 UNITS<br>(PNPNPN) | 5<br>5 UNITS<br>(PNPPN) | 6<br>5 UNITS<br>(PNPPN) | 7<br>5 UNITS<br>(PPNPP) | 8<br>5 UNITS<br>(PPNPP) |
| 1 | | | | | | | | |
| 2    θ gF | 0.689(GT1, GT2) | 0.665(GT1, GT2) | 0.689(GT1) | 0.689(GT1, GT2) | 0.689 (GIT1) | 0.689 (GIT1) | 0.689 (GIT1) | 0.689 (GIT2) |
| 3 | | | | | | | | |
| 4    θ gd | 1.422(GT1, GT2) | 1.386(GT1, GT2) | 1.422(GT1) | 1.422(GT1, GT2) | 1.422 | 1.422 | 1.422 | 1.422 |
| 5    (GT) | 22.7(GIT1, GT2) | 39.8(GIT1, GT2) | 22.7(GIT1) | 22.7(GIT1, GT2) | 22.7 | 22.7 | 22.7 | 22.7 |
| νd < 60 | — | — | — | — | — | — | — | — |
| 6    OTLt/ft | 1.9 | 1.9 | 0.7 | 0.7 | 0.8 | 0.8 | 1.2 | 1.2 |
| 7    OTLw/fw | 7.4 | 7.4 | 5.5 | 5.5 | 2.2 | 2.1 | 3.2 | 3.3 |

TABLE 1-continued

| | | NUMERICAL EXAMPLE | | | | | | | |
|---|---|---|---|---|---|---|---|---|---|
| | CONDITIONAL EXPRESSION | 1<br>5 UNITS<br>(PNPNP) | 2<br>5 UNITS<br>(PNPNP) | 3<br>6 UNITS<br>PNPNPN) | 4<br>6 UNITS<br>(PNPNPN) | 5<br>5 UNITS<br>(PNPPN) | 6<br>5 UNITS<br>(PNPPN) | 7<br>5 UNITS<br>(PPNPP) | 8<br>5 UNITS<br>(PPNPP) |
| 8 | OTLt/OTLw | 1.2 | 1.2 | 1.3 | 1.3 | 1.3 | 1.3 | 1.0 | 1.0 |
| 9 | | | | | | | | | |
| 10 | $60 < \nu d$ | — | — | 81.54(5 UNITS) | — | — | — | — | — |
| 11 | $fGIT\sqrt{(fw \times ft)}$ | 7.9<br>1.8 | 8.3<br>1.7 | 5.3<br>— | 4.9<br>1.8 | 6.4 | 1.2 | 1.4 | −800.4 |
| 12 | $fGIT1\sqrt{(fw \times ft)}$ | 7.9 | 8.3 | 5.3 | 4.9 | 6.4 | 1.2 | 1.4 | — |
| 13 | $fGIT2\sqrt{(fw \times ft)}$ | 1.8 | 1.7 | — | 1.8 | — | — | — | −800.4 |
| 14 | $f1\sqrt{(fw \times ft)}$ | 1.76 | 1.76 | 1.02 | 1.02 | 0.82 | 0.80 | 1.64 | 1.51 |
| 15 | $\|f2\|\sqrt{(fw \times ft)}$ | 0.29 | 0.29 | — | 0.18 | 0.5 | 0.4 | — | — |
| | | GIT1<br>GIT2 | GIT1<br>GIT2 | GIT1 | GIT1<br>GIT2 | GIT1 | GIT1 | GIT1 | GIT2 |
| 16 | $\dfrac{f1}{fGIT1}$ | 0.22 | 0.21 | 0.19 | 0.21 | 0.13 | 0.35 | 1.14 | — |
| 17 | $\left\|\dfrac{f2}{fGIT2}\right\|$ | 0.48 | 0.55 | — | 0.18 | — | — | — | 0.0 |

P: POSITIVE
N: NEGATIVE

Next, an example in which the zoom lens shown in the examples 1 through 8 can be applied to an image pickup apparatus will be described with reference to FIG. 25.

FIG. 25 is a principal-part schematic view of a single-lens reflex camera. In FIG. 25, reference numeral 10 is a camera lens including a zoom lens 1 according to at least one of the examples 1 through 8. The zoom lens 1 is held with a lens-barrel 2 serving as a holding member. Reference numeral 20 is a camera body, which comprises a quick return mirror 3 for reflecting light flux from the camera lens 10 upwards, a focusing plate 4 disposed on an image formation device of the camera lens 10, a pentagonal roof prism 5 for converting the reverse image formed on the focusing plate 4 into an erected image, a ocular lens 6 for observing the erected image. Reference numeral 7 is a photosurface, on which a solid-state image pickup device (photoelectric transfer device) such as a CCD sensor or CMOS sensor, or a silver-salt film is disposed. The quick return mirror 3 is evacuated from a light path at the time of shooting, an image is formed on the photosurface 7 by the camera lens 10.

FIGS. 26A-H illustrate example cross-sectional views of the lenses at a telephoto end of each embodiment respectively (referred to as Examples 1 through 8 in the specification), which includes a paraxial marginal ray and paraxial chief ray for each embodiment.

The features described above with reference to examples 1 through 8 are effectively realized in optical equipment such as that discussed in the present example.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-175494 filed Jun. 15, 2005, which is hereby incorporated by reference herein in its entirety.

What is claimed is:

1. A zoom lens system comprising:
   a refractive optical element having positive refracting power, which is made up of a solid material;
   wherein the Abbe number vd and partial dispersion ratio θgF of the solid material satisfies the following conditions $-2.100 \times 10^{-3} \cdot \nu d + 0.693 < \theta gF$ $0.555 < \theta gF < 0.9$; and wherein with the zoom lens, the maximum value at the telephoto end of the height, from the optical axis, of a paraxial marginal ray passing through the lens surface further forward than the intersection between the optical axis and a paraxial chief ray is greater than the maximum value at the telephoto end of the height, from the optical axis, of the paraxial marginal ray passing through the lens surface backward from the intersection.

2. The zoom lens system according to claim 1, wherein the partial dispersion ratio θgd of the solid material satisfies the following conditions $-2.407 \times 10^{-3} \cdot \nu d + 1.420 < \theta gd$ $1.255 < \theta gd < 1.67$.

3. The zoom lens system according to claim 1, wherein the Abbe number vd of the solid material satisfies the following condition $\nu d < 60$.

4. The zoom lens system according to claim 1, wherein the height at the wide-angle end of the paraxial marginal ray passing through the most forward lens surface is smaller than the maximum value at the wide-angle end of the height, from the optical axis, of the paraxial marginal ray passing though the lens surface backward from the intersection.

5. The zoom lens system according to claim 1, wherein when assuming that the optical entire length at the telephoto end of the zoom lens system is OTLt, and the focal length at the telephoto end of the zoom lens system is ft, the following condition $$0.5 < OTLt/ft < 2.2$$

is satisfied.

6. The zoom lens system according to claim 1, wherein when assuming that the optical entire length at the wide-angle end of the zoom lens system is OTLw, and the focal length at the wide-angle end of the zoom lens system is fw, the following condition $$1.9 < OTLw/fw < 10$$

is satisfied.

7. The zoom lens system according to claim 1, wherein when assuming that the optical entire length at the wide-angle end of the zoom lens system is OTLw, and the entire optical length at the telephoto end of the zoom lens system is OTLt, the following condition $$1 \leq OTLt/OTLw < 2$$

is satisfied.

8. The zoom lens system according to claim 1, further comprising:
a second refractive optical element of which an Abbe number vd and a partial dispersion ratio θgF satisfy the following conditions $$-1.500 \times 10^{-3 \cdot vd} + 0.6425 < \theta gF$$

$$vd < 60;$$

wherein the second refractive optical element is positioned further forward than the intersection; and
wherein the refractive optical element having positive refracting power is positioned backward from the intersection.

9. The zoom lens system according to claim 1, further comprising:
a second refractive optical element of which an Abbe number vd and a partial dispersion ratio θgF satisfy the following conditions $$-1.500 \times 10^{-3 \cdot vd} + 0.6425 < \theta gF$$

$$vd < 60;$$

wherein the second refractive optical element is positioned backward from the intersection; and
wherein the refractive optical element having positive refracting power is positioned further forward than the intersection.

10. The zoom lens system according to claim 1, wherein when assuming that the focal length of the refractive optical element having positive refracting power is fGIT, and the focal length at the wide-angle end of the zoom lens is fw, and the focal length at the telephoto end of the zoom lens is ft, the following condition $$0.5 < fGIT/\sqrt{(fw \times ft)} < 20$$

is satisfied.

11. The zoom lens system according to claim 1, further comprising:
a first refractive optical element which is positioned forward from the intersection; and
a second refractive optical element which is positioned backward from the intersection;
wherein the first refractive optical element and the second refractive optical element are both the optical elements having positive refracting power.

12. The zoom lens system according to claim 11, wherein when assuming that the focal length of the first refractive optical element is fGIT1, and the focal length of the second refractive optical element is fGIT2, the following conditions $$1.0 < fGIT1/\sqrt{(fw \times ft)} < 10$$

$$1.3 < fGIT2/\sqrt{(fw \times ft)} < 3$$

are satisfied.

13. A zoom lens system comprising in order from forwards to backwards:
a first lens unit having positive optical power;
a second lens unit having negative optical power; and
a rear lens component having positive optical power as a whole;
wherein with the zoom lens system, the interval between the first lens unit and the second lens unit, and the interval between the second lens unit and rear lens component are changed at the time of zooming; and
wherein the first lens unit comprises a refractive optical element having positive refracting power made up of a solid material, and the Abbe number vd and partial dispersion ratio θgF of the solid material satisfies the following conditions.

$$-2.100 \times 10^{-3 \cdot vd} + 0.693 < \theta gF$$

$$0.555 < \theta gF < 0.9.$$

14. The zoom lens system according to claim 13, further comprising:
a second refractive optical element of which an Abbe number vd2 and a partial dispersion ratio θgF2 satisfy the following conditions $$-1.500 \times 10^{-3 \cdot vd2} + 0.6425 < \theta gF2$$

$$vd2 < 60;$$

wherein said rear lens component includes an aperture stop, and
wherein the second refractive optical element is positioned backward from the aperture stop.

15. The zoom lens system according to claim 13, wherein when assuming that the focal length of the refractive optical element having positive refracting power is fGIT, and the focal length at the wide-angle end of the zoom lens is fw, and the focal length at the telephoto end of the zoom lens is ft, the following condition $$0.5 < fGIT/\sqrt{(fw \times ft)} < 20$$

is satisfied.

16. The zoom lens system according to claim 13, wherein when assuming that the focal lengths of the first lens unit and the second lens unit are f1 and F2 respectively, and the focal lengths at the wide-angle end and at the telephoto end of the entire system are fw and ft respectively, the following conditions $$0.6 < f1/\sqrt{(fw \times ft)} < 2$$

$$0.1 < |f2|/\sqrt{(fw \times ft)} < 0.7$$

are satisfied.

17. A zoom lens system comprising in order from the object side to the image side:
- a first lens unit having positive optical power;
- a second lens unit having negative optical power; and
- a rear lens component having positive optical power as a whole, which includes an aperture stop, and a lens unit having positive optical power disposed backward from the aperture stop;
- wherein with the zoom lens system, the interval between the first lens unit and the second lens unit, and the interval between the second lens unit and rear lens component are changed at the time of zooming; and
- wherein the lens unit having positive optical power disposed backward from the aperture stop comprises a refractive optical element having positive refracting power made up of a solid material, and the Abbe number vd and partial dispersion ratio θgF of the solid material satisfies the following conditions $$-2.100 \times 10^{-3 \cdot vd} + 0.693 < \theta gF$$

$$0.555 < \theta gF < 0.9.$$

18. The zoom lens system according to claim 17, further comprising:
- a second refractive optical element of which an Abbe number vd2 and a partial dispersion ratio θgF2 satisfy the following conditions $$-1.500 \times 10^{-3 \cdot vd2} + 0.6425 < \theta gF2$$

$$vd2 < 60;$$

wherein the second refractive optical element is positioned further forward than the aperture stop.

19. The zoom lens system according to claim 17, wherein when assuming that the focal length of the refractive optical element having positive refracting power is fGIT, and the focal length at the wide-angle end of the zoom lens is fw, and the focal length at the telephoto end of the zoom lens is ft, the following condition $$0.5 < fGIT/\sqrt{(fw \times ft)} < 20$$

is satisfied.

20. The zoom lens system according to claim 17, wherein when assuming that the focal lengths of the first lens unit and the second lens unit are f1 and f2 respectively, and the focal lengths at the wide-angle end and at the telephoto end of the entire system are fw and ft respectively, the following conditions $$0.6 < f1/\sqrt{(fw \times ft)} < 2$$

$$0.1 < |f2|/\sqrt{(fw \times ft)} < 0.7$$

are satisfied.

21. An image pickup apparatus comprising:
- the zoom lens system according to claim 1; and
- a photoelectric transfer device for photo-accepting an image to be fonned by the zoom lens system.

22. An image pickup apparatus comprising:
- the zoom lens system according to claim 13; and
- a photoelectric transfer device for photo-accepting an image to be formed by the zoom lens system.

23. An image pickup apparatus comprising:
- the zoom lens system according to claim 17; and
- a photoelectric transfer device for photo-accepting an image to be formed by the zoom lens system.

* * * * *